United States Patent [19]
Yano et al.

[11] Patent Number: 5,731,979
[45] Date of Patent: Mar. 24, 1998

[54] MAP INFORMATION DISPLAY APPARATUS FOR VEHICLE

[75] Inventors: Fumiko Yano; Hirofumi Goto, both of Hyogo, Japan

[73] Assignee: Mitsubishi Denki Kabushiki Kaisha, Tokyo, Japan

[21] Appl. No.: 466,745

[22] Filed: Jun. 6, 1995

[30] Foreign Application Priority Data

Jan. 20, 1995 [JP] Japan .................................. 7-007782

[51] Int. Cl.⁶ .................................................. G06F 165/00
[52] U.S. Cl. ...................... 364/449.5; 364/449.6; 340/995
[58] Field of Search ............................ 364/443, 449, 364/460, 449.1, 449.2, 449.5, 449.6, 423.098; 340/988, 990, 995

[56] References Cited

U.S. PATENT DOCUMENTS

| | | | |
|---|---|---|---|
| 5,031,104 | 7/1991 | Ikeda et al. | 364/449 |
| 5,119,301 | 6/1992 | Shimizu et al. | 364/449 X |
| 5,323,152 | 6/1994 | Morita | 340/988 |
| 5,398,188 | 3/1995 | Maruyama | 364/449 |
| 5,450,343 | 9/1995 | Yurimoto et al. | 364/449 |
| 5,493,294 | 2/1996 | Morita | 340/988 |
| 5,559,511 | 9/1996 | Ito et al. | 340/995 |

FOREIGN PATENT DOCUMENTS

| | | |
|---|---|---|
| 4033326 | 4/1991 | Germany. |
| 4033837 | 4/1991 | Germany. |
| 2-46086 | 10/1990 | Japan. |

*Primary Examiner*—Collin W. Park
*Attorney, Agent, or Firm*—Sughrue, Mion, Zinn, Macpeak & Seas, PLLC

[57] ABSTRACT

There is provided a map information display apparatus comprising a control unit, responsive to a signal informing that a predetermined area on a display unit has been indicated, for switching a display from a state of displaying a single map image on the screen in scroll mode in which the center of the map image constantly shows the current position of the vehicle detected by a position detecting unit and the map image is scrolled as the vehicle travels to a state of displaying a first map image with the same scale as the single map image which has been displayed on the screen in a base screen region and a second map image with a scale in a window screen region. Furthermore, touching an area of the base or window screen region switches the display into single display mode. Thus, switching between single display mode in which a single map image fills the screen of the display unit and parent display mode in which two map images associated with each other are respectively displayed in the base and window screen regions can be accomplished without having to use a mechanical switch.

18 Claims, 20 Drawing Sheets

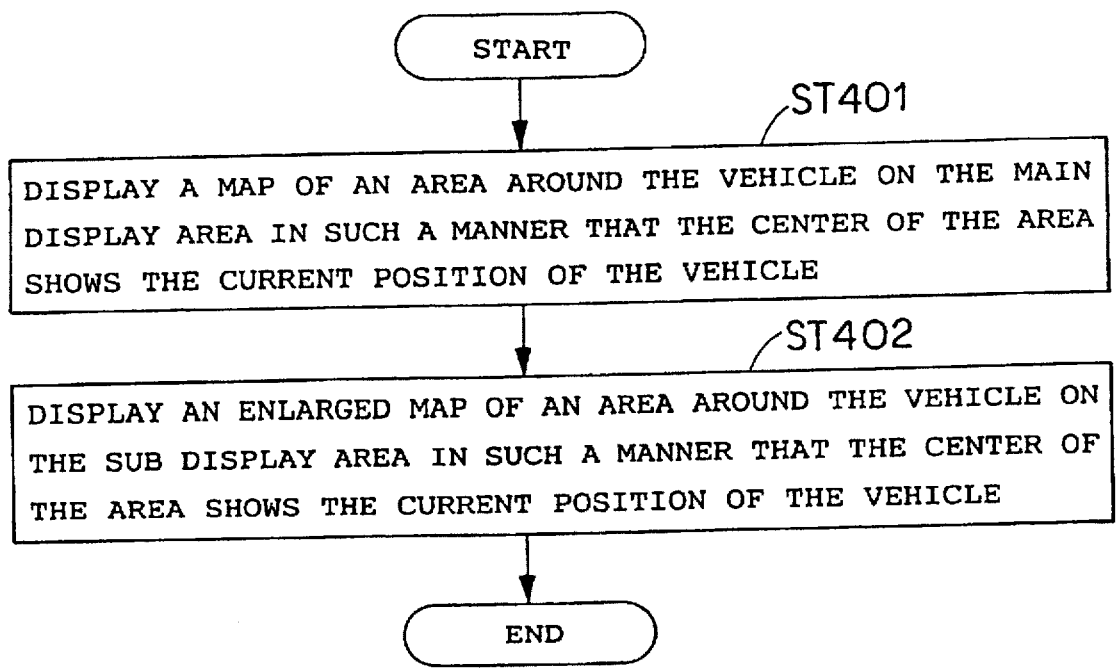

MAP INFORMATION DISPLAY APPARATUS FOR VEHICLE

BACKGROUND OF THE INVENTION

1. Field of the Invention

The present invention relates to a map information display apparatus for use with a vehicle for displaying the current position of the vehicle on a map image displayed on the screen of a display.

2. Description of a Conventional System

FIG. 32 illustrates a block diagram showing the structure of a map information display apparatus for a vehicle as disclosed in Japanese Patent Laid-Open No. 2-46 086. In FIG. 32, there are shown a CRT display 11 for displaying a map image, a ROM package 12 for storing map data, a manual operating unit 13, a direction sensor 14 for detecting the direction in which a vehicle is headed, a distance sensor 15 for detecting distance traveled by the vehicle, an electronic control unit 16 provided with a microcomputer 21 constituted by a MPU 17, a ROM 18, a RAM 19 and a I/O 20, and a display controller 22 for performing a display controlling operation on the CRT display 11.

FIG. 33 shows screen regions on the screen of the CRT display 11, which is composed of a displaying main region 11a and a displaying sub region 11b.

Next, the description will be directed to an operation of the map information display apparatus. FIG. 34 shows a flow diagram showing the operation after turning on the map information display apparatus. The electronic control unit 16 obtains the current position of the vehicle on the basis of data about the direction in which the vehicle is headed from the direction sensor 14 and data about the distance traveled by the vehicle from the distance sensor 15 and then reads a piece of map information about an area in the vicinity of the current position of the vehicle from the ROM package 12. The navigation apparatus advances to step ST401 to display both a map image the center of which constantly shows the current position of the vehicle with a scale preset through the manual operating unit 13 and a current position mark for showing the current position of the vehicle on the main display region 11a of the screen display. After that, the map information display apparatus, in step ST 402, displays a map image of a smaller area including the current vehicle position with a larger scale than that in the main display region 11a in the sub display region 11b on the screen of the CRT display 11.

In this example, the displayed map images remain unchanged on the screen and only the current position mark moves on the screen as the vehicle travels. When the vehicle is not within the area which corresponds to the map image displayed in the sub display region 11b and therefore the current position mark is out of view in the sub display region 11b on the screen, the map image in the sub display region 11b will be replaced by a new map image, the center of which shows the current position of the vehicle.

In this manner, the map information display apparatus for a vehicle with the above structure is adapted to display a parent and child picture including a map image in the main display region 11a and a larger-scale map image in the sub display region 11b on the same CRT display 11. However, when the user desires to select either a parent and child picture with two map images in these regions on the screen of the CRT display 11 or a single picture with a single map image fills the screen of the CRT display 11, the user needs to manipulate a selector switch for selecting one of them.

The provision of such a selector switch, e.g., a button switch for switching between image styles representing map images on the surrounding of the CRT display needs a space and therefore limits the system configuration. Alternatively, a touch-sensitive panel can be laid over the screen of the CRT display 11 and a touch switch may be displayed as a switch for switching between a parent and child picture with two map images in these regions on the screen of the CRT display 11 and a single picture with a single map image fills the screen of the CRT display 11, i.e., between image styles of a picture displayed on the screen. In such a case, a problem is that a part of the screen becomes invisible due to the switch for switching between image styles of a picture displayed on-screen.

SUMMARY OF THE INVENTION

It is therefore an object of the present invention to provide a map information display apparatus for use with a vehicle capable of switching between parent display mode in which two map images associated with each other are displayed in a base screen region and a window screen region and single display mode in which a single map image is displayed on the screen of a graphic display without making images on the screen invisible.

It is another object of the present invention to provide a map information display apparatus for use with a vehicle capable of switching between parent display mode in which two map images associated with each other are displayed in the base and window screen regions and single display mode in which a single map image is displayed on the screen of the display, and further capable of scrolling and finally displaying a map image in fixed mode in which the center of the map image shows a touched position of a touch screen.

According to the present invention, a map information display apparatus for use with a vehicle comprises a position detecting unit for detecting a current position of the vehicle, a map storage unit for storing map information classified into plural levels of scale, a display unit for displaying a map image based on a piece of map information read out from said storage unit and the current position of the vehicle detected by the position detecting unit on a screen thereof, an indicated position detecting unit for generating a signal which indicates a position on the display responsive to a touch operation of a user, and a control unit, responsive to a signal informing that a predetermined area of the display unit has been indicated, for switching the display unit from a state of displaying a single map image which substantially fills the screen of the display unit in scroll mode in which the center of the map image constantly shows the current position of the vehicle detected by the position detecting unit and the map image is scrolled as the vehicle travels to a state of displaying a first map image with the same scale as the previous map image which has filled the screen in a base screen region on the screen and a second map image with a scale in a window screen region on the screen, while maintaining scroll mode for both the regions.

When a single map image is displayed on the screen of the display unit in scroll mode, in response to a signal informing that a predetermined area on the display unit has been indicated, the control unit switches the display unit to a state of displaying a first map image with the same scale as the previous map which has filled the screen in the base screen region and a second map image with a scale in the window screen region, while maintaining scroll mode for both the regions. Thus, switching from single display mode in which a single map image fills the screen of the display unit to parent display mode in which two map images associated with each other are respectively displayed in the base and window screen regions can be accomplished without having to use a mechanical switch.

The predetermined area may be anywhere on the surface of the display unit. In this case, the display unit is switched from single display mode in which a single map image is displayed on the screen to parent display mode in which two map images associated with each other are respectively displayed in the base and window screen regions regardless of the position on the surface of the display unit indicated by the user.

When two map images associated with each other are displayed in the base and window screen regions respectively, in response to a signal informing that an area corresponding to the base screen region on the screen has been indicated, the control unit switches the display unit to a state of displaying a single map image, which substantially fills the screen of the display unit, with the same scale as the first map image which has been displayed in the base screen region. Alternatively, when the control unit receives a signal informing that an area corresponding to the window screen region on the screen has been indicated, the display unit is switched into a state of displaying a single map image, which substantially fills the screen of the display unit, with the same scale as the second map image which has been displayed in the window screen region. Thus, the display unit can be switched from parent display mode in which two map images associated with each other are respectively displayed in the base and window screen regions to single display mode in which a single map image substantially fills the screen of the display unit, without having to use a mechanical switch.

According to a preferred embodiment of the invention, the predetermined area is only a central area in the vicinity of the center on the display unit which corresponds to the center of the screen of the display unit. Therefore, only if the central area of the screen is indicated, the display unit is switched from single display mode in which a single map image fills the screen of the display unit to parent display mode which two map images associated with each other are displayed in the base and window screen regions respectively. Furthermore, when an area except the central area of the screen is indicated, the control unit is adapted to control the display unit in a state for displaying in scroll mode a single map image which substantially fills the screen of the display unit so as to scroll the map image and finally display the map image in fixed mode in which the center of the map image constantly shows a point on the map image which corresponds to the indicated area of the screen and the map image is not scrolled even if the vehicle travels. In this case, when the control unit further receives a signal informing that the central area of the screen has been indicated, the display unit is controlled to scroll the map image which substantially fills the screen of the display unit in fixed mode and is switched into scroll mode in which the center of the map image constantly shows the current position of the vehicle and the map image is scrolled as the vehicle travels. Thus, switching from single display mode in which a single map image fills the screen of the display unit to parent display mode in which two map images associated with each other are respectively displayed in the base and window screen regions can be accomplished without having to use a mechanical switch. In addition, touching an arbitrary position except the center of the screen can easily scroll the map image displayed on the screen. Furthermore, the display unit can be switched into fixed mode in which the center of the map image shows the touched position on the map image.

Preferably, when two map images are displayed in the base and window screen regions respectively, the control unit, in response to a signal informing that an area of the screen which corresponds to a predetermined area of the base or window screen region on the screen has been indicated, switches the display unit to a state of displaying a single map image which substantially fills the screen of the display unit with the same scale as the map image which has been displayed in the base or window screen region. The predetermined area of the base or window screen region may be a central area of the base or window screen region. In this case, only if the indicated area on the display unit corresponds to the central area of the base or window screen region on the screen, the control unit switches the display unit to a state of displaying in scroll mode a single map image, which substantially fills the screen of the display unit, with the same scale as the first or second map image which has been displayed in the base or window screen region. Thus, switching from parent display mode in which two map images associated with each other are respectively displayed in the base and window screen regions to single display mode in which a single map image substantially fills the screen of the display unit can be accomplished without having to use a mechanical switch.

On the other hand, if the indicated area on the display unit corresponds to an area except the central area of the base or window screen region on the screen, the control unit scrolls the map image in the base or window screen region and then switches the base or window screen region to fixed mode in which the center of the first or second map image in the base or window screen region constantly shows a point on the first or second map image which corresponds to the indicated area on the display unit and the first or second map image is not scrolled even if the vehicle travels. When the control unit further receives a signal informing that an area on the display unit which corresponds to the central area of the base or window screen region on the screen has been indicated, it switches the display unit to scroll mode in which the center of the first or second map image in the base or window screen region constantly shows the current position of the vehicle and the first or second map image is scrolled as the vehicle travels. Thus, touching an arbitrary position except the center of the base or window screen region can easily scroll the map image displayed in the base or window screen region. Furthermore, the base or window screen region can be switched into fixed mode in which the center of the map image shows a point on the map image which corresponds to the touched part of the screen.

In a preferred embodiment of the invention, the predetermined area of the base or window screen region is anywhere in the base or window screen region. In this case, if the indicated area on the display unit corresponds to the base or window screen region on the screen, the control unit switches the display unit to a state of displaying a single map image, which substantially fills the screen of the display unit, in fixed mode in which the center of the map image constantly shows a point on the map image which corresponds to the indicated area on the display unit and hence the map image is not scrolled even if the vehicle travels. Thus, touching an arbitrary position within the base or screen region can easily produces a scrolled map image associated with the map image which has been displayed in the base or window screen region. Furthermore, the display unit can be switched into fixed mode in which the center of the map image shows a point on the map image which corresponds to the touched part of the screen. When the control unit further receives a signal informing that the central area of the screen has been indicated, it scrolls the single map image and switches the display unit from a state of displaying in fixed mode the single map image which substantially fills the screen of the display unit to a state of displaying a single map image in scroll mode in which the center of the map image constantly shows the current position of the vehicle and the map image is scrolled as the vehicle travels.

Further objects and advantages of the present invention will be apparent from the following description of the preferred embodiments of the invention as illustrated in the accompanying drawings.

BRIEF DESCRIPTION OF THE DRAWINGS

FIG. 34 is flow diagram showing an operation of the prior art apparatus of FIG. 32.

DETAILED DESCRIPTION OF THE PREFERRED EMBODIMENTS

Figure 1:
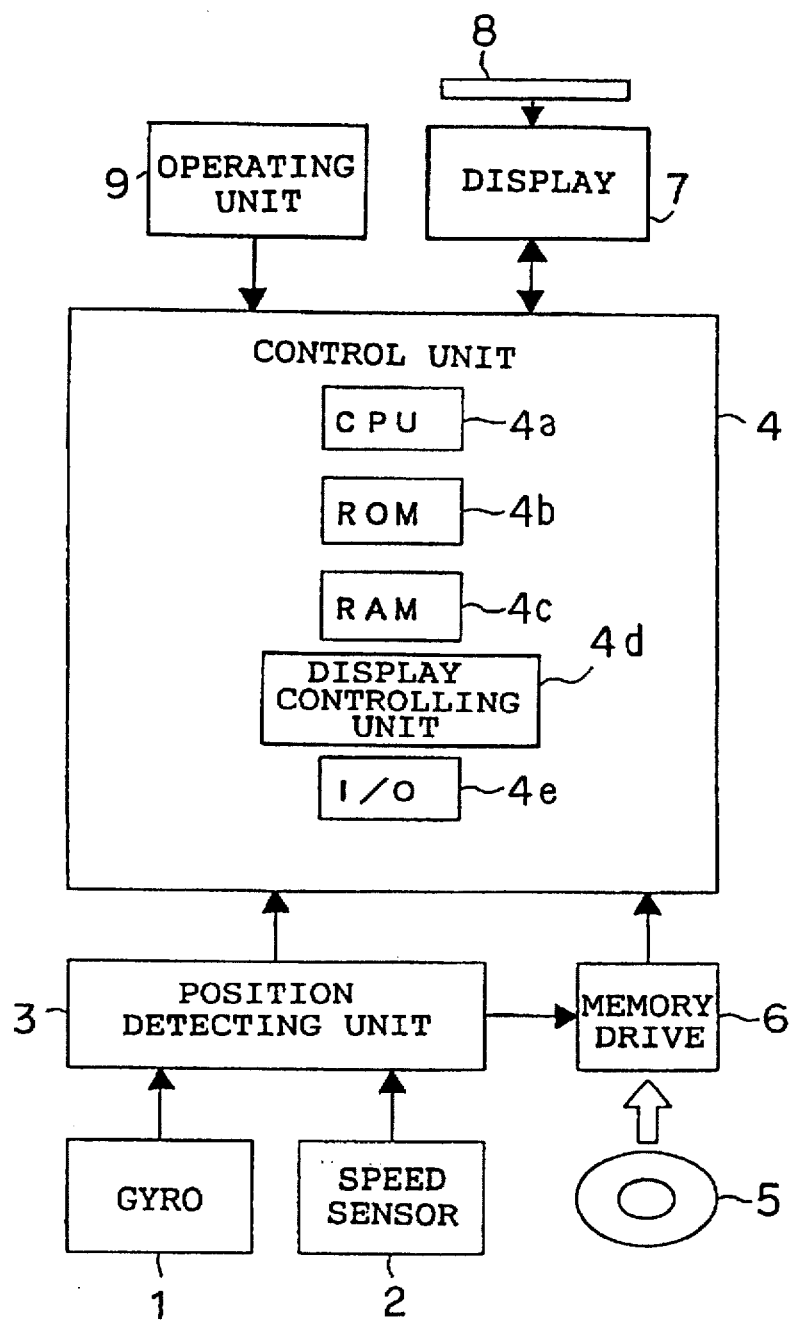
FIG. 1 is a block diagram of a map information display apparatus for user with a vehicle according to an embodiment of the present invention.

Referring now to FIG. 1, it illustrates a block diagram showing a map information display apparatus for vehicles according to an embodiment of the present invention. In the figure, reference numeral 1 denotes a gyro for detecting the angular velocity during cornering of the vehicle, reference numeral 2 denotes a speed sensor for detecting the speed of the vehicle, and reference numeral 3 denotes a position detecting unit for determining the current position of the vehicle from the amount of change in the direction of the vehicle obtained by summation of the amounts of angular velocity during cornering detected by the gyro 1 over a predetermined interval and the distance traveled by the vehicle obtained by summation of the amounts of speed detected by the speed sensor 2 over a predetermined interval. Furthermore, reference numeral 4 denotes a control unit, reference numeral 5 denotes a map memory such as a CD-ROM or the like for storing map data classified into multiple levels of scale, reference numeral 6 denotes a memory drive for reading map data from the map memory 5, and reference numeral 7 denotes a display unit for displaying a map image on the screen thereof.

The control unit 4 is comprised of a CPU 4a, a ROM 4b, a RAM 4c, a display controlling unit 4d for performing a controlling operation on the display unit 7, and an I/O 4e for controlling the input/output data flow between the control unit 4 and unit disposed outside the control unit 4. The map memory 5 may be classified into four levels of scale; a map data drawn on a scale of 1 to 400,000, a map data drawn on a scale of 1 to 100,000, a map data drawn on a scale of 1 to 25,000 and a map data drawn on a scale of 1 to 12,500 are stored. The user can select one of them according to the uses to which the navigation apparatus is put or preferences of the user. The scales of these scale maps are 4 km, 1 km, 250 m and 100 m per cm in order of increasing scale.

Figure 2:
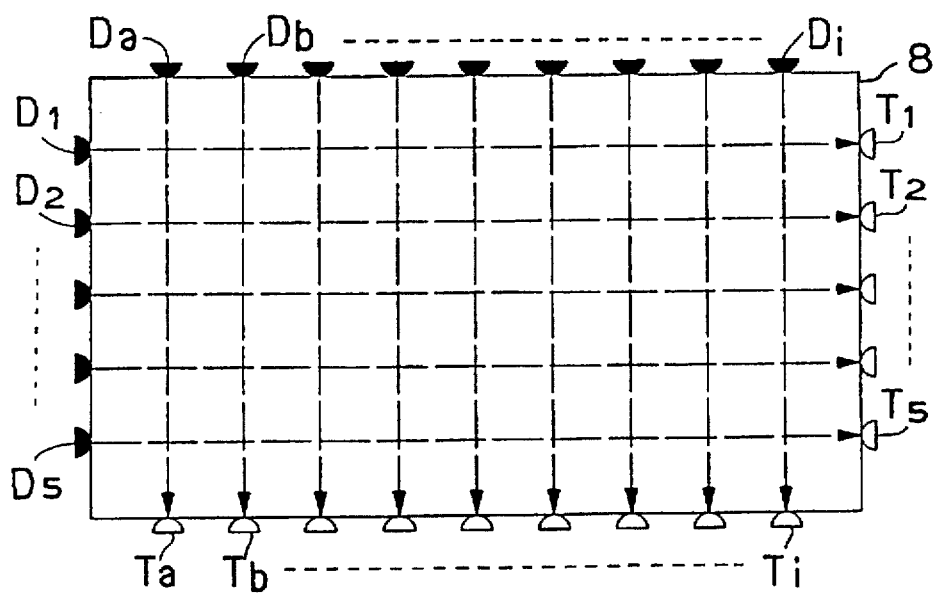
FIG. 2 is a plan view showing the structure of the touch-sensitive panel of the map information apparatus of the embodiment of FIG. 1.

Reference numeral 8 denotes a touch position detecting section comprising light-emitting elements Da to Di and photoreceptors Ta to Ti disposed opposite to each other and light-emitting elements D1 to D5 and the photoreceptors T1 to T5 disposed opposite to each other as shown in FIG. 2. A space between the light-emitting elements Da to Di, D1 to D5 and photoreceptors Ta to Ti, T1 to T5 forms an optical touch-sensitive panel (touch panel). Each of the plurality of photoreceptors aligned in a horizontal row or a vertical row receives an infrared light emitted by a corresponding one of the plural light-emitting elements aligned in a row opposite to the plurality of photoreceptors. When the user touches a part of the surface of the touch panel with a finger or the like, a light travelling to a photoreceptor through the touched part is blocked. Then, the touch position detecting section 8 tells the control unit 4 which part is indicated. In the example of FIG. 2, the touch position detecting section 8 consists of a 5-row, 9-column array of 5×9 sensitive parts which correspond to the filled-in circles in FIG. 3 to provide 5×9 inputs. In this specification, the sensitive part on the most upper left side is called the touch position 1a, the sensitive part on the most lower right side is called the touch position 5i, for example.

Furthermore, in FIG. 1, reference numeral 9 denotes an operating unit for inputting operating instruction signals for turning on and off the map information display apparatus or navigation apparatus, for enlarging and reducing a map image, and for scrolling around a map image displayed on the screen of the display unit 7.

Figure 5:
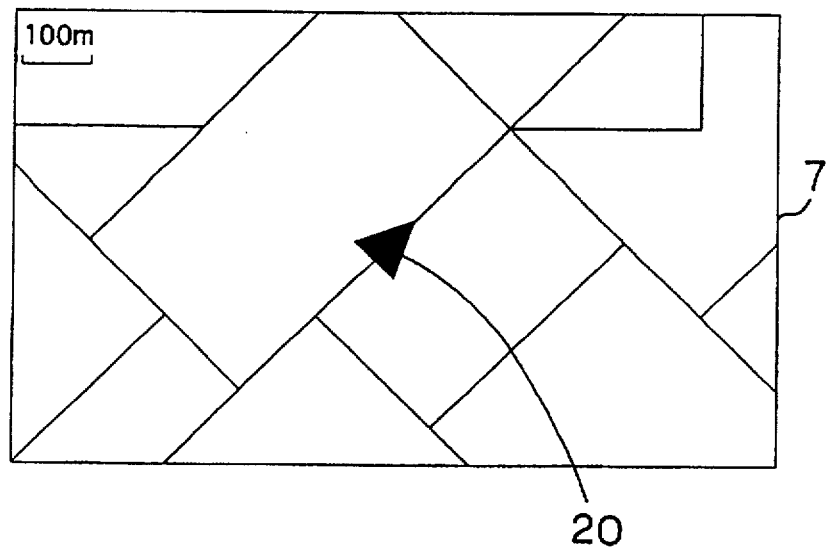
FIG. 5 is a representation of a display unit with a map image according to an embodiment of the present invention.
Figure 6:
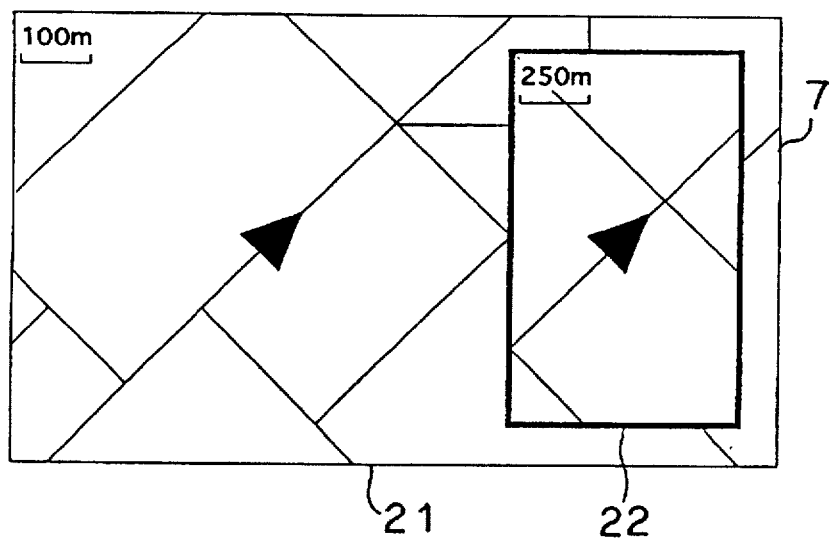
FIG. 6 is another representation of the display unit with a window shown thereon according to the embodiment of the present invention.
Figure 7:
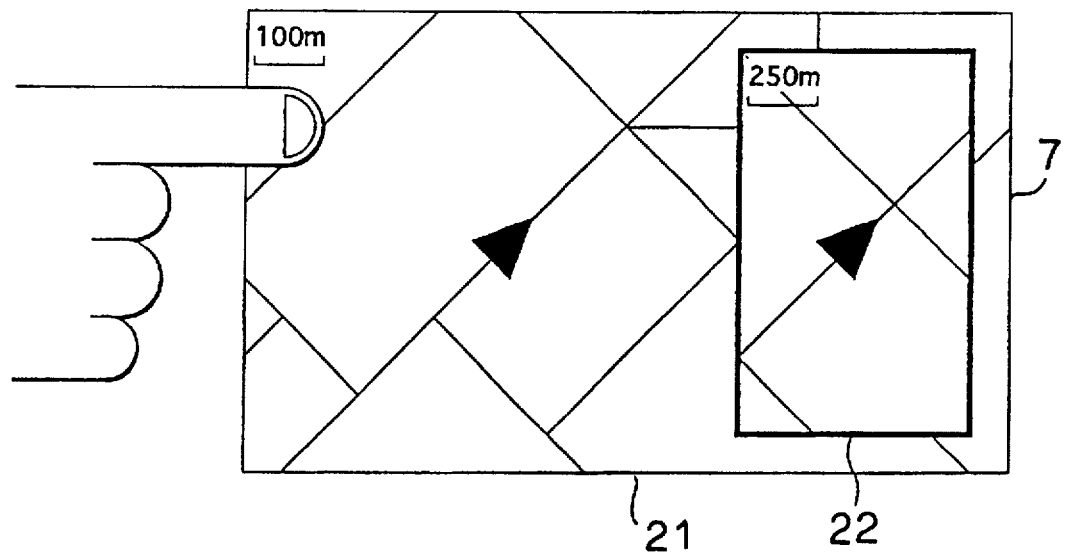
FIG. 7 is another representation of the display unit with a window shown thereon according to the embodiment of the present invention.
Figure 8:
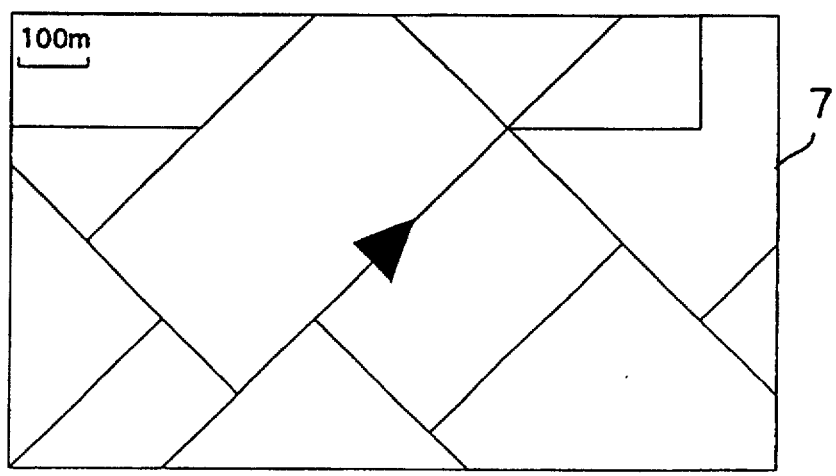
FIG. 8 is another representation of the display unit with a map image according to the embodiment of the present invention.
Figure 9:
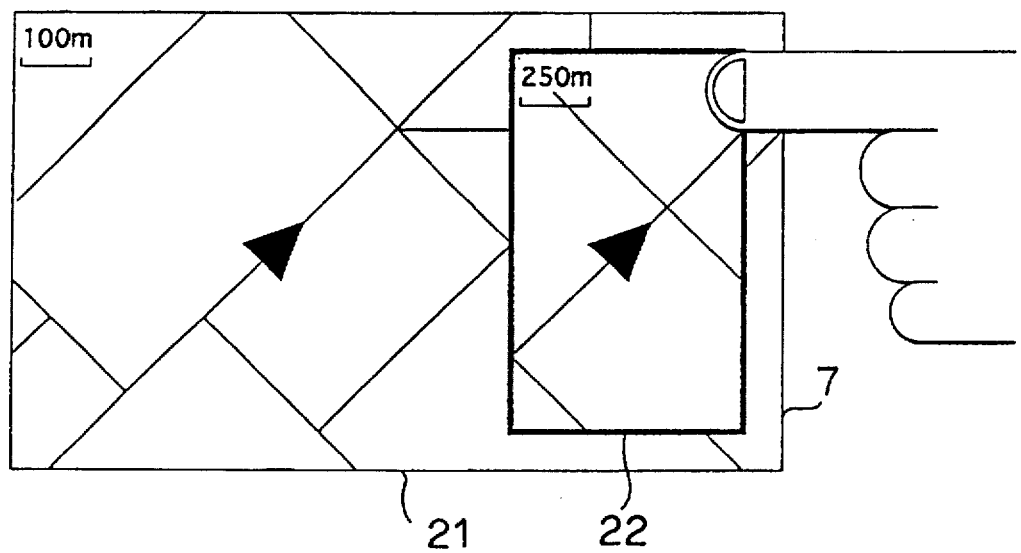
FIG. 9 is another representation of the display unit with a window shown thereon according to the embodiment of the present invention.

Next, the description will be directed to an operation of the navigation apparatus. After the navigation apparatus is turned on through the operating unit 9, the display unit 7 displays a map image, the center of which constantly shows the current position of the vehicle, on the screen thereof, as shown in FIG. 5. The current vehicle position mark 20 is also displayed at the center of the map image. When the user further touches the touch panel which is formed on the surface of display unit 8, a window 22 is further displayed on the screen as shown in FIG. 6. In this case, a map image drawn on a scale of 1 to 12,500 is displayed in the base screen region (or base screen) 21 and a map image drawn on a scale of 1 to 25,000 is displayed in the window screen region (or window screen) 22. Furthermore, as shown in FIG. 7, when the user touches a sensitive part of the touch panel which corresponds to an area within the base screen region 21 which is not hidden by the window screen region 22, the display unit 7 is allowed to display a single map image, which is associated with the map image which has been displayed in the base screen region, drawn on a scale of 1 to 12,500 shown in FIG. 8, the center of which constantly shows the current position of the vehicle, on the screen thereof. Alternatively, as shown in FIG. 9, when the user touches a sensitive part of the touch panel which corresponds to an area within the window screen region 22, the display unit 7 is allowed to display a single map image, which is associated with the map image which has been displayed in the window screen region, drawn on a scale of 1 to 25,000 shown in FIG. 10, the center of which constantly shows the current position of the vehicle, on the screen thereof.

Next, a basic operation of the control unit 4 will be explained by referring to a flow diagram shown in FIG. 4. In step ST101, when the navigation apparatus is activated through the operating unit 9, the control unit 4 receives data on the current position of the vehicle detected by the position detecting unit 3 and then sends the data to the memory drive 6. According to the received position data, the memory drive 6 reads out map data about an area in the vicinity of the vehicle position from the map memory 6.

Figure 3:
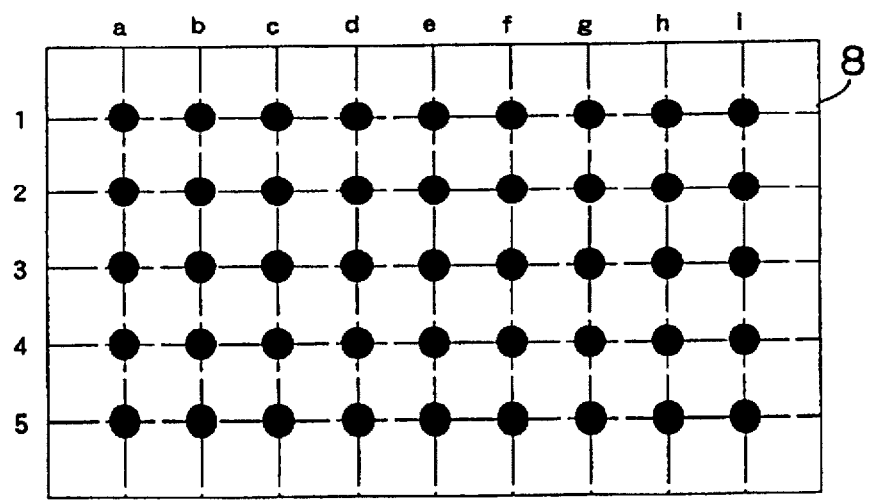
FIG. 3 is a plan view showing a array of touch switches of the touch-sensitive panel of FIG. 2.
Figure 11:
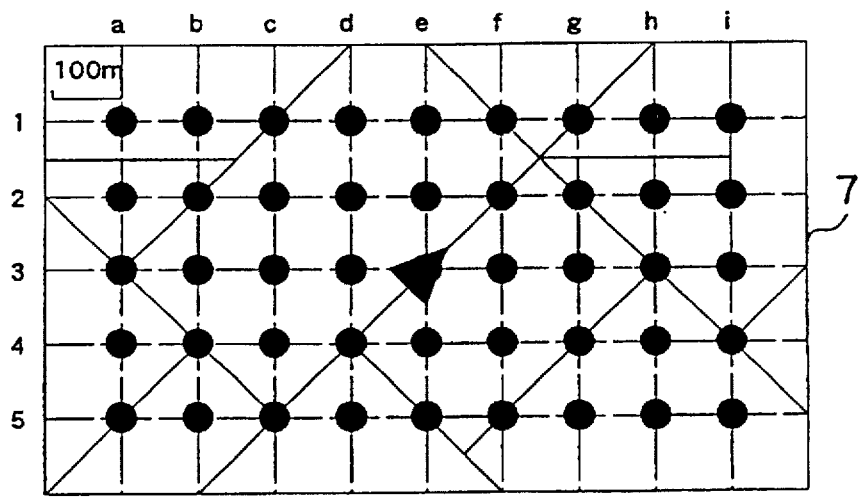
FIG. 11 is a plan view showing the touched positions on the screen of the display unit according to the present invention.

The scale of the map data is equivalent to the one which has been set with the operating unit 9 and stored in a last memory. For example, the scale of the map data is a scale of 1 to 12,500. The control unit 4 proceeds to step ST 102 wherein it allows the display unit 7 to display the read out map image on the screen of the display unit 7 in such a manner that the current vehicle position on the map image is constantly coincident with the center of the map image, as shown in FIG. 5. The display unit 7 further displays the triangle-shaped vehicle position mark 20 at the center of the map image to inform the driver of the direction in which the vehicle is headed. In order to provide a clear understanding of a positional relationship between the sensitive parts of the touch panel and a map image displayed on the screen of the display unit 7, the result of overlaying FIG. 3 showing the touch panel on FIG. 4 showing a map image displayed on the screen of the display unit 7 is shown in FIG. 11. It should be understood that the filled-in circles in FIG. 11 are actually invisible.

Figure 4:
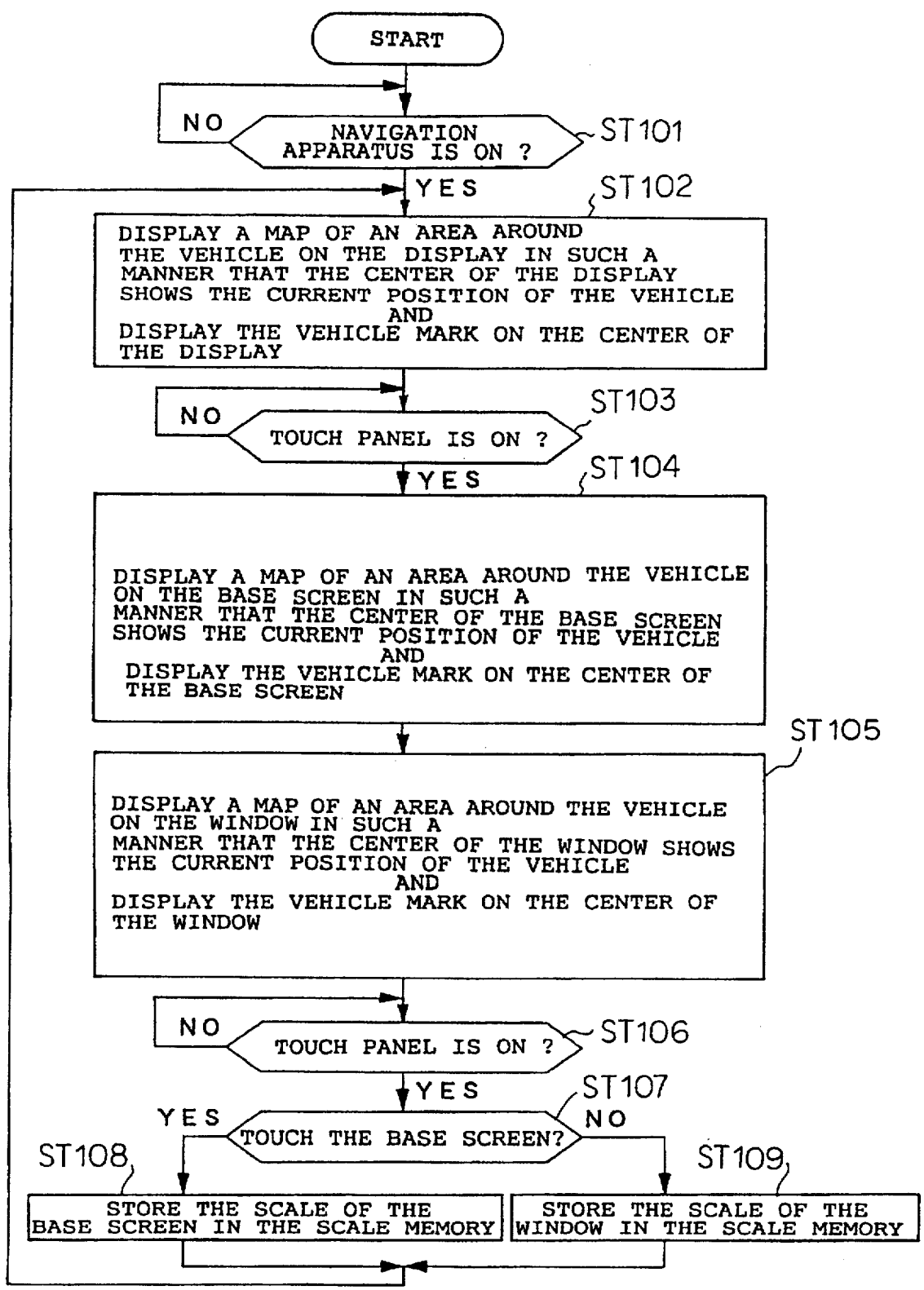
FIG. 4 is a flow diagram showing an operation of the navigation apparatus of the embodiment.

In the case that a map image and the vehicle position mark are displayed on the screen of the display unit as shown in FIG. 4 or FIG. 11, when the user touches the surface of the touch panel with a finger or the like to activate it in step ST 103, the memory drive 6 reads out map data about an area in the vicinity of the current vehicle position to display the map information in the base screen region 21. The scale of the map data is equivalent to the previous one which has been set on the base screen and is stored in the last memory. For example, the scale of the map data is a scale of 1 to 12,500. The control unit 4 advances to step ST 104 wherein it allows the display unit 7 to display the read out map image in the base screen region on the screen of the display unit 7 in such a manner that the current vehicle position on the map image is constantly at the center of the base screen region 21 which is not hidden by the window screen region 22, as shown in FIG. 6. The display unit 7 further displays the triangle-shaped vehicle position mark 20 at the center of the base screen region to inform the driver of the direction in which the vehicle is headed.

Figure 12:
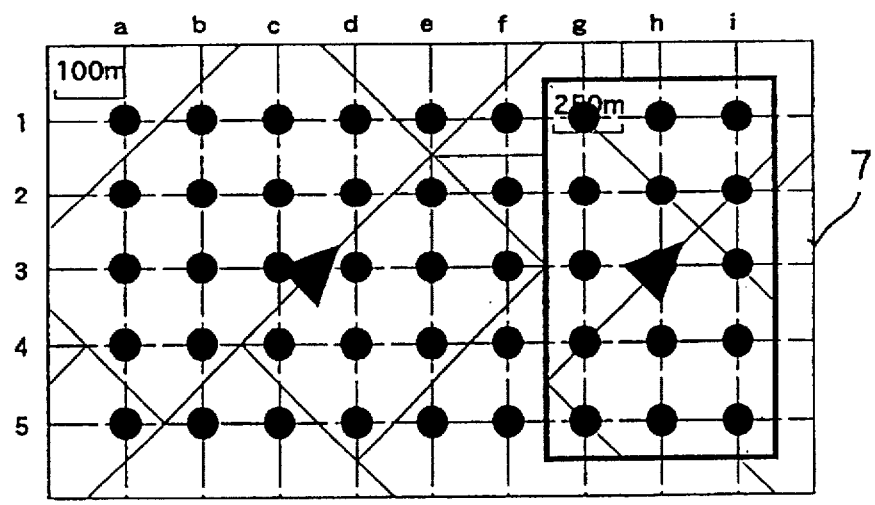
FIG. 12 is a plan view showing the touched positions on the screen of the display unit according to the present invention.

Furthermore, the memory drive 6 reads out map data about an area in the vicinity of the current vehicle position to display the map information in the window screen region 22. The scale of the map data is equivalent to the previous one which has been set on the window screen and is stored in the last memory. For example, the scale of the map data is a scale of 1 to 25,000. The control unit 4 advances to step ST 105 wherein it allows the display unit 7 to display the read out map image on the screen of the display unit 7 in such a manner that the current vehicle position on the map image is constantly at the center of the window screen region 22, as shown in FIG. 6. The display unit 7 further displays the triangle-shaped vehicle position mark 20 at the center of the window screen region to inform the driver of the direction in which the vehicle is headed. In order to provide a clear understanding of a positional relationship between the sensitive parts of the touch panel and a map image displayed on the screen of the display unit 7, the result of overlaying FIG. 3 showing the touch panel on FIG. 5 showing map images displayed on the screen of the display unit 7 is shown in FIG. 12. It should be understood that the filled-in circles in FIG. 12 are actually invisible.

Figure 10:
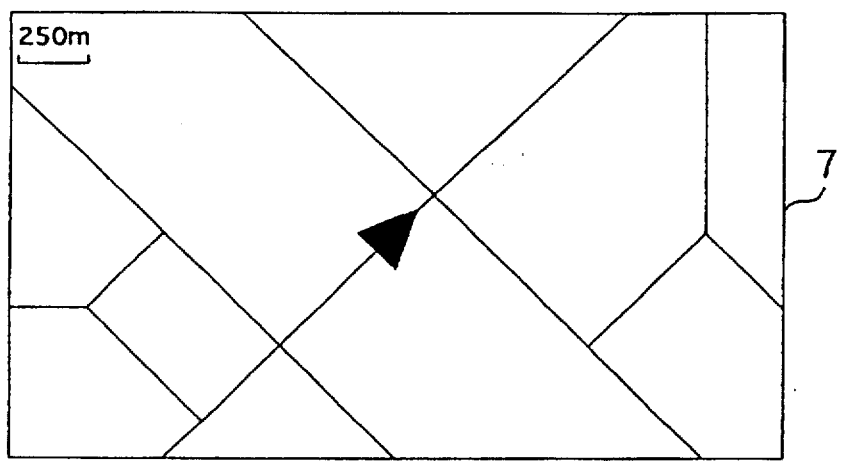
FIG. 10 is another representation of the display unit with a map image according to the embodiment of the present invention.

In the case that map images are respectively displayed in the base screen region 21 and window screen region 22 as shown in FIG. 6 or FIG. 12, when the user touches the touch panel with a finger or the like to activate it in step ST 106, the touch position detecting section 8 informs the control unit 4 of which sensitive part is activated in step ST107. If the user touches one of the touch positions 1a to 5f in horizontal rows a to f shown in FIG. 12, that is, the user touches an area within the base screen region 21 which is not hidden by the window screen region 22, as shown in FIG. 7, the scale of the map image displayed in the base screen region 21 is registered in the scale memory in step ST108. Furthermore, the control unit 4 returns to step ST102 wherein it allows the display unit 7 to display a single 1:12,500 scale map image the center of which constantly shows the current vehicle position on the screen, which is associated with the map image which has been displayed in the base screen region, as shown in FIG. 8. If the user touches one of the positions 1g to 5i in horizontal rows g to i shown in FIG. 12, that is, the user touches an area within the window screen region 22 as shown in FIG. 9, the scale of the map image displayed in the window screen region 22 is registered in the scale memory in step ST109. Furthermore, the control unit 4 returns to step ST102 wherein it allows the display unit 7 to display a single 1:25,000 scale map image the center of which constantly shows the current vehicle position on the screen, which is associated with the map image which has been displayed in the window screen region, as shown in FIG. 10. Thus, switching between single display mode in which a single map image is displayed on the screen and parent display mode in which two map images are displayed on the screen can be accomplished.

Next, the description will be directed to another embodiment of the present invention. However, since the map information display apparatus, i.e., the navigation apparatus of this embodiment has the same structure as the first embodiment mentioned above, the structure of the apparatus according to this embodiment will not be explained.

Figure 15:
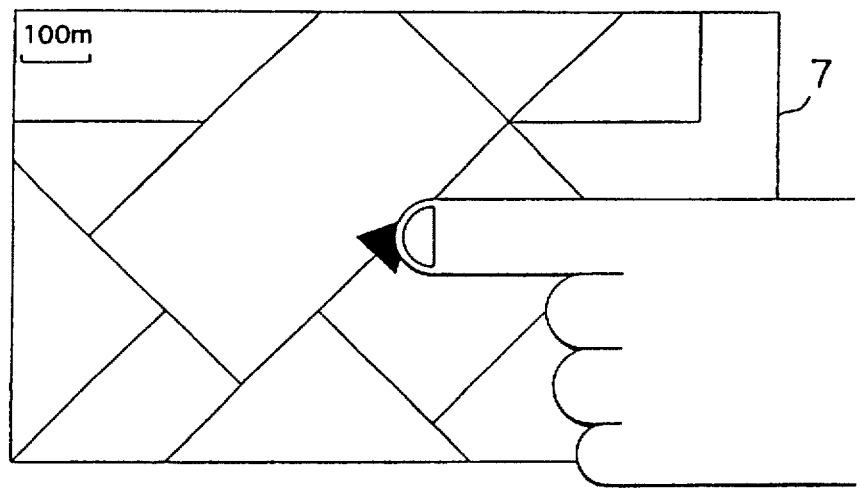
FIG. 15 is a representation of a display unit with a map image according to another embodiment of the present invention.
Figure 16:
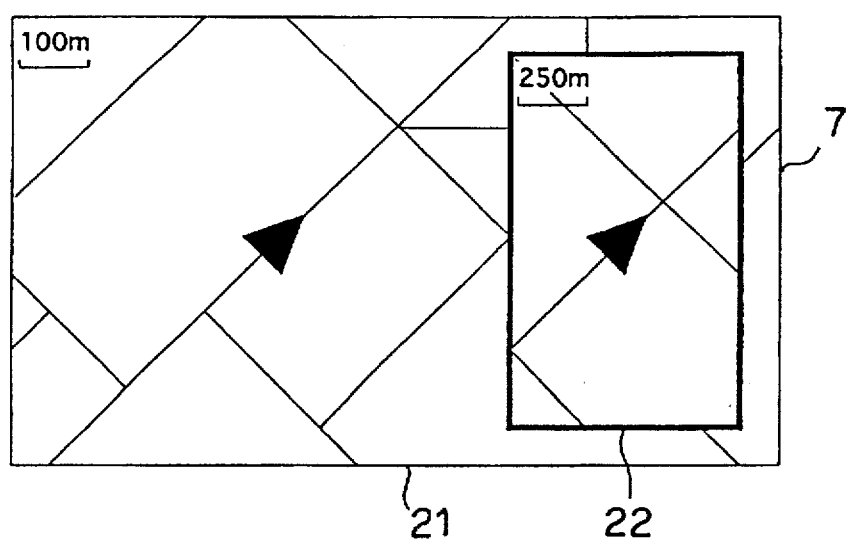
FIG. 16 is another representation of the display unit with a window shown thereon according to the embodiment of the present invention.
Figure 17:
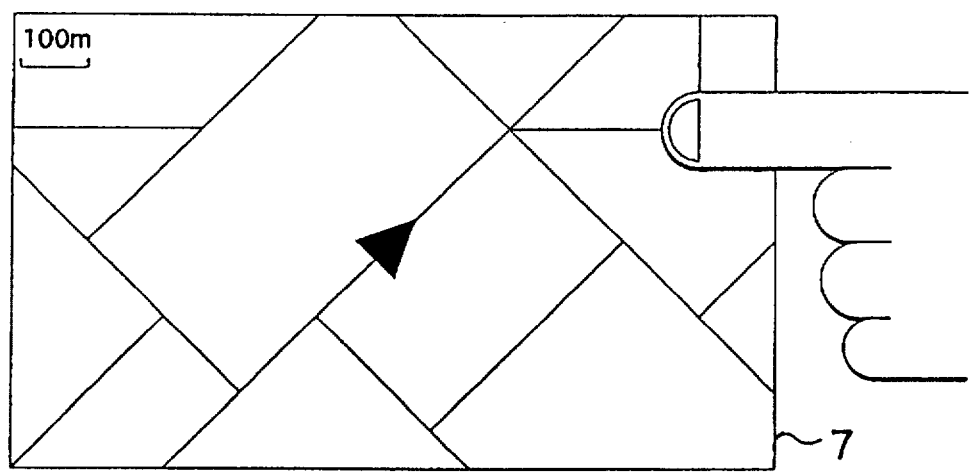
FIG. 17 is a representation of a display unit with a map image according to the embodiment of the present invention.
Figure 18:
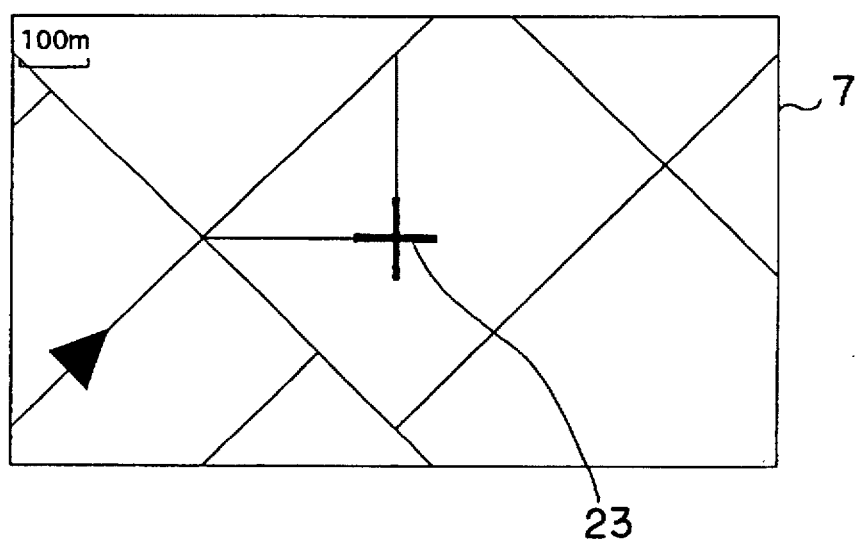
FIG. 18 is another representation of the display unit with a map image according to the embodiment of the present invention.

In operation, when the user turns on the navigation apparatus with the operating unit 9, a map image the center of which constantly shows the current vehicle position is displayed on the screen of the display unit, as shown in FIG. 5. When the user touches the center of the screen as shown in FIG. 15, a window is also displayed on the screen as shown in FIG. 16. For example, a map image, which is associated with the single map image which has been displayed on the screen, drawn on a scale of 1 to 12,500 is displayed in the base screen region 21 and a map image, which is associated with the first map image displayed in the base screen region, drawn on a scale of 1 to 25,000 is displayed in the window screen region 22. Alternatively, when the user touches a part of the touch panel apart from the center of the panel as shown in FIG. 17, the map image is scrolled in such a manner that the point on the map image, which corresponds to the touched part of the touch panel, is constantly displayed at the center of the screen as shown in FIG. 18. Then, a cross line mark 23 for showing the center of the screen is further displayed. Each time the user touches a part of the touch panel apart from the center, the map image is scrolled, however, when the user touches the cross mark 23 at the center of the screen, the display unit is switched into scroll mode in which map image the center of which constantly shows the current position of the vehicle is displayed on the screen, as shown in FIG. 17. Then, the image map is scrolled as the vehicle travels.

Figure 19:
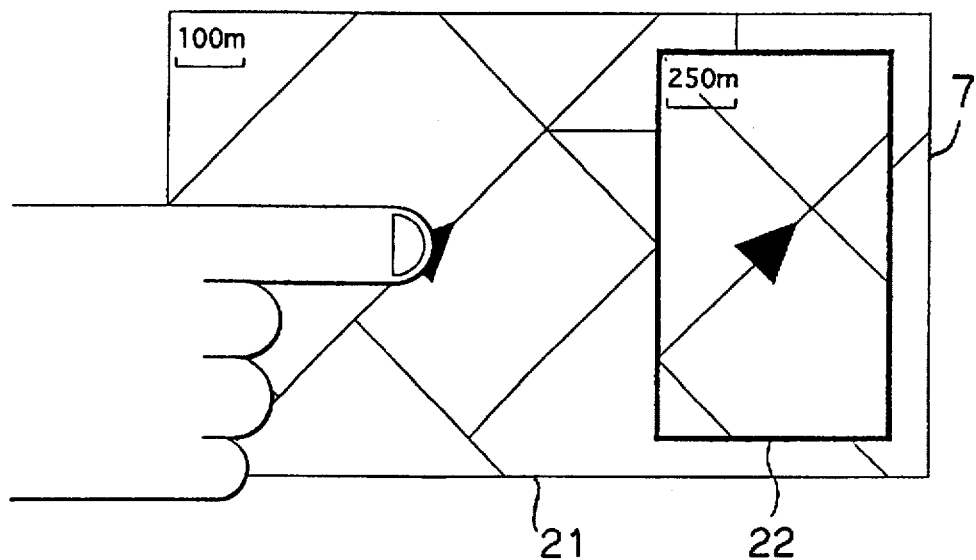
FIG. 19 is another representation of the display unit with a window shown thereon according to the embodiment of the present invention.
Figure 20:
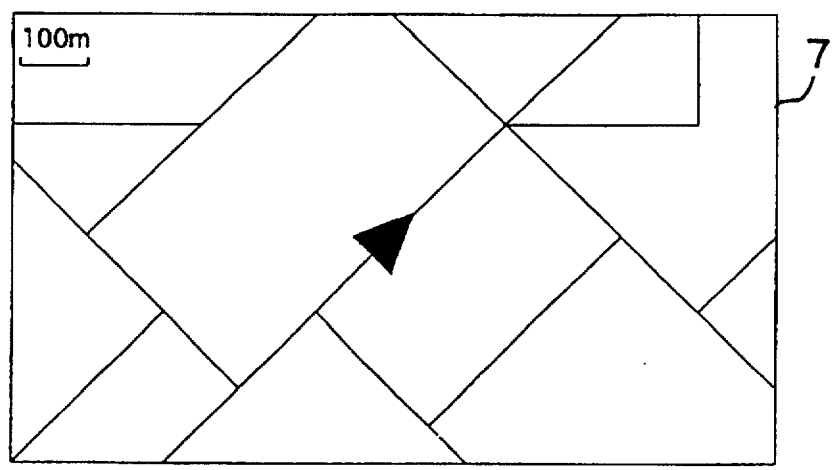
FIG. 20 is another representation of the display unit with a map image according to the embodiment of the present invention.
Figure 21:
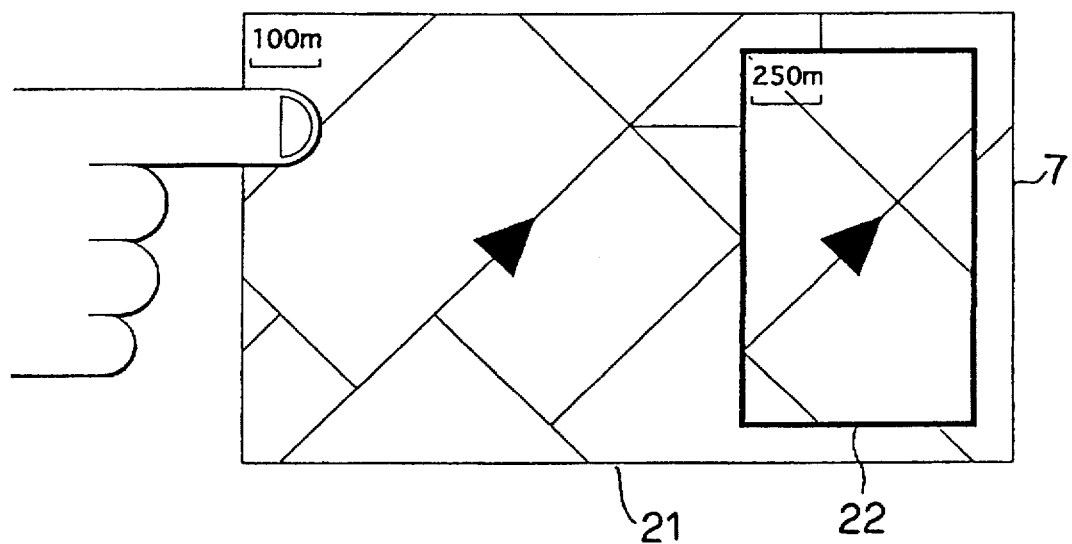
FIG. 21 is another representation of the display unit with a map image according to the embodiment of the present invention.
Figure 22:
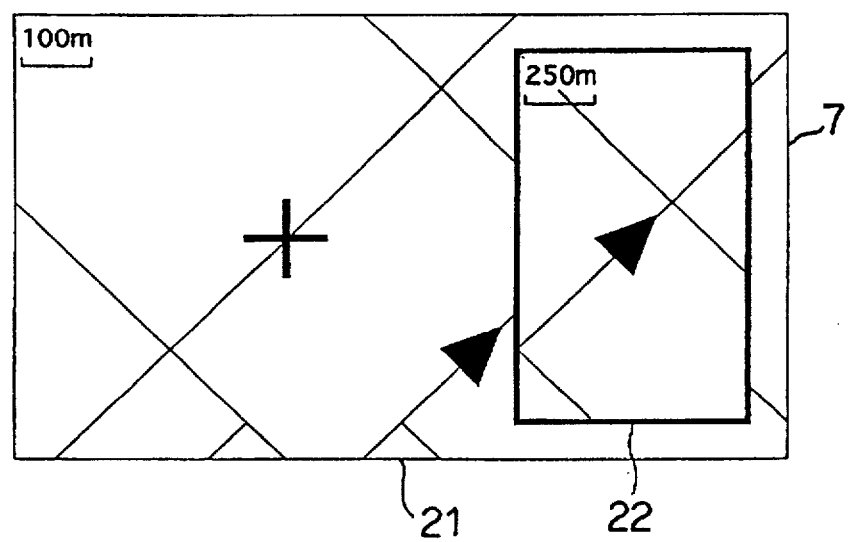
FIG. 22 is another representation of the display unit with a window shown thereon according to the embodiment of the present invention.

In the case that the display unit is put in parent display mode in which two map images associated with each other are displayed on the screen, when the user touches the center of the base screen region 21 as shown in FIG. 19, the control unit allows the display unit to display a single map image, the center of which shows the current vehicle position, with the same scale as the map image which has been displayed in the base screen region, i.e., a scale of 1 to 12,500, as shown in FIG. 20. The single map image is associated with the map image which has been displayed in the base screen region. Alternatively, when the user touches an area within the base screen region apart from the center as shown in FIG. 21, the map image is scrolled so that the touched point of the map image is constantly displayed at the center of the base screen region 21 which is not hidden by the window and the cross line mark 23 showing the center of the base screen 21 is further displayed in the base screen region, as shown in FIG. 22. Each time the user touches an area within the base screen region apart from the center, the map image is scrolled, however, when the user touches the cross mark 23 at the center of the base screen region, the display unit is switched into scroll mode in which the map image the center of which constantly shows the current position of the vehicle is displayed in the base screen region 21, as shown in FIG. 21. Then, the map image in the base screen region is scrolled as the vehicle travels.

Figure 23:
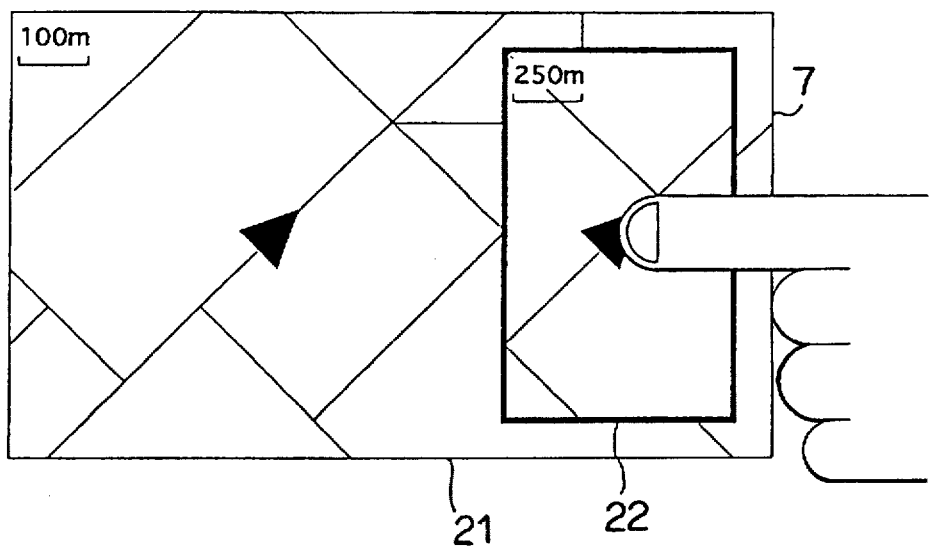
FIG. 23 is another representation of the display unit with a window shown thereon according to the embodiment of the present invention.
Figure 24:
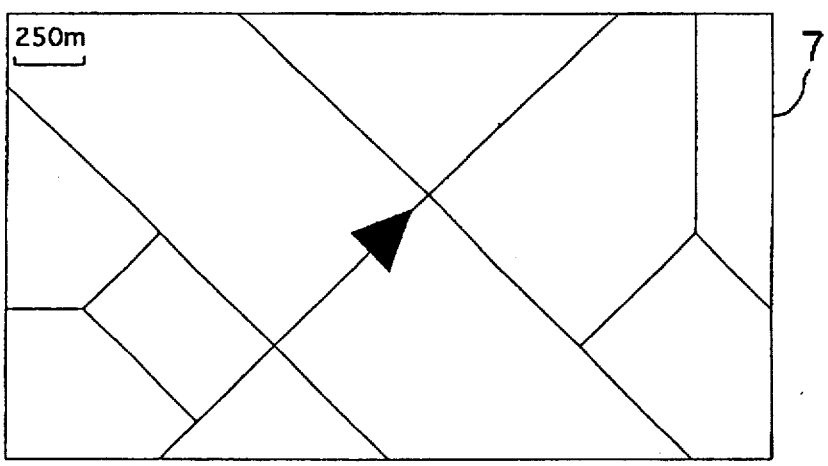
FIG. 24 is another representation of the display unit with a map image according to the embodiment of the present invention.
Figure 25:
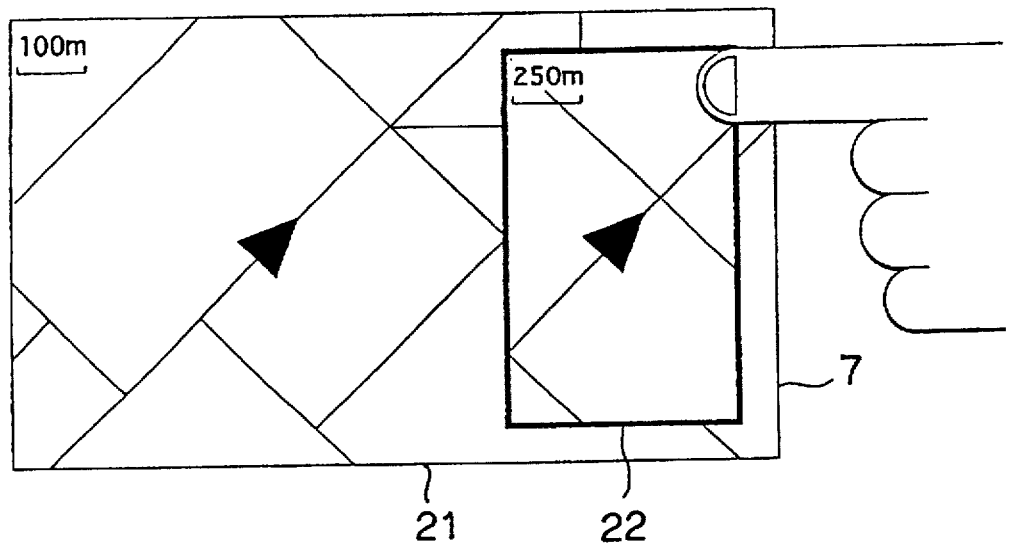
FIG. 25 is another representation of the display unit with a window shown thereon according to the embodiment of the present invention.
Figure 26:
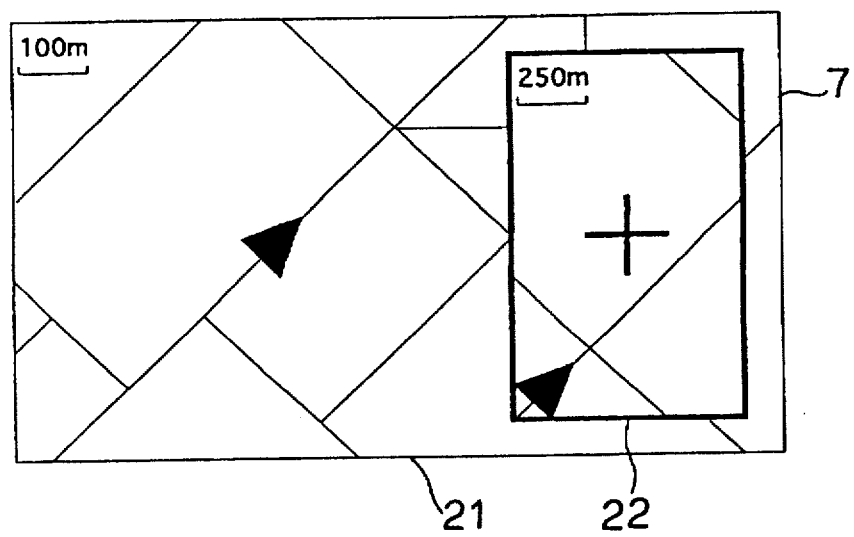
FIG. 26 is another representation of the display unit with a window shown thereon according to the embodiment of the present invention.

When the user touches the center of the window screen region 22 as shown in FIG. 23, the control unit allows the display unit to display a single map image, the center of which constantly shows the current vehicle position, with the same scale as the map image which has been displayed in the window screen region, i.e., a scale of 1 to 25,000, as shown in FIG. 24. The single map image is associated with the map image which has been displayed in the window screen region. Alternatively, when the user touches an area within the window screen region apart from the center as shown in FIG. 25, the map image is scrolled so that the touched point of the map image is constantly displayed at the center of the window screen region 22 and the cross line mark 23 showing the center of the window screen region is further displayed, as shown in FIG. 26. Each time the user touches an area within the window screen region apart from the center, the map image is scrolled, however, when the user touches the cross mark 23 at the center of the window screen, the display unit is switched into scroll mode in which the map image the center of which constantly shows the current position of the vehicle is displayed in the window screen region 22, as shown in FIG. 25. Then, the map image is scrolled as the vehicle travels.

Figure 13:
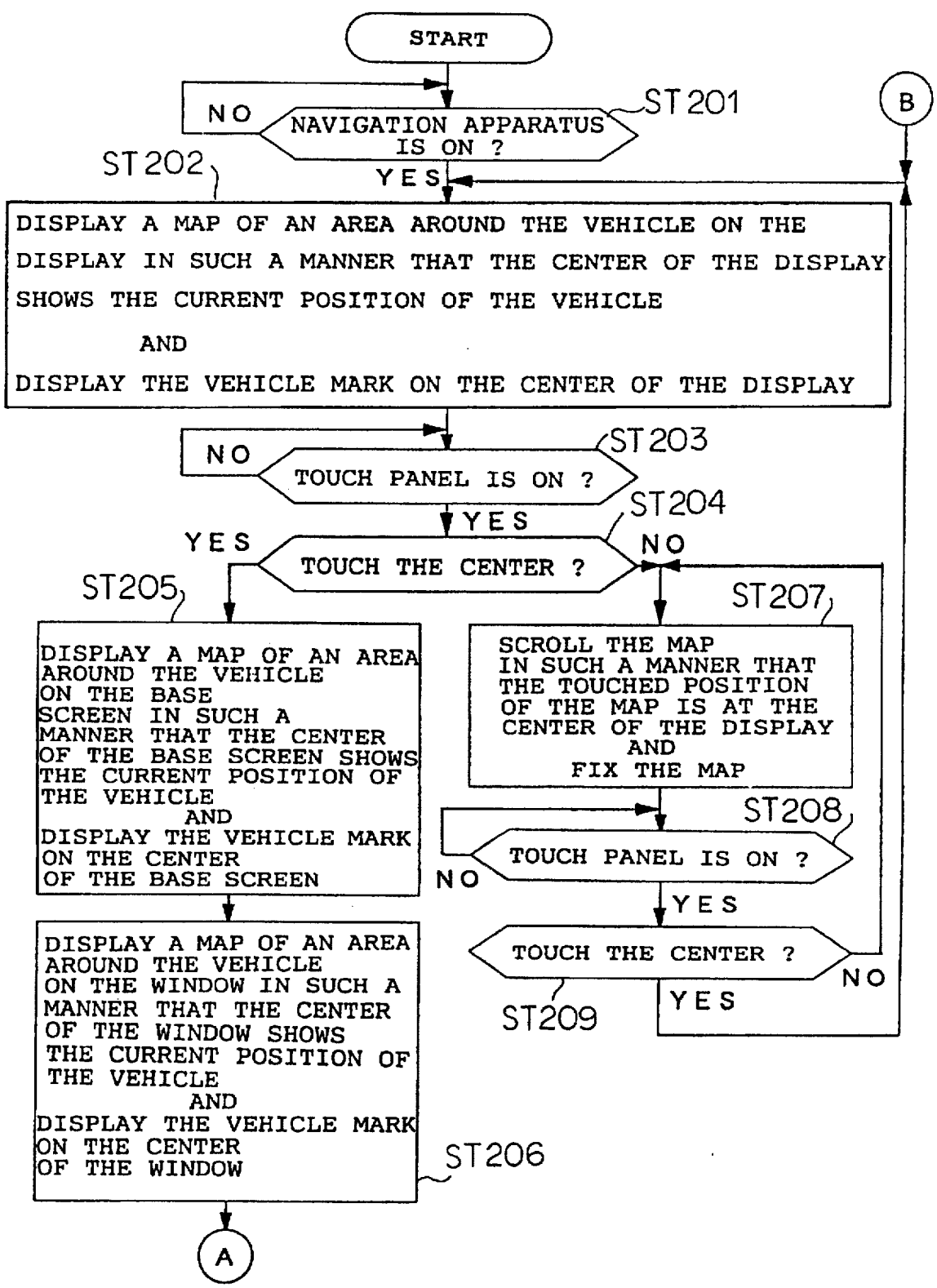
FIGS. 13 and 14 are flow diagrams showing an operation of the navigation apparatus of the embodiment.
Figure 14:
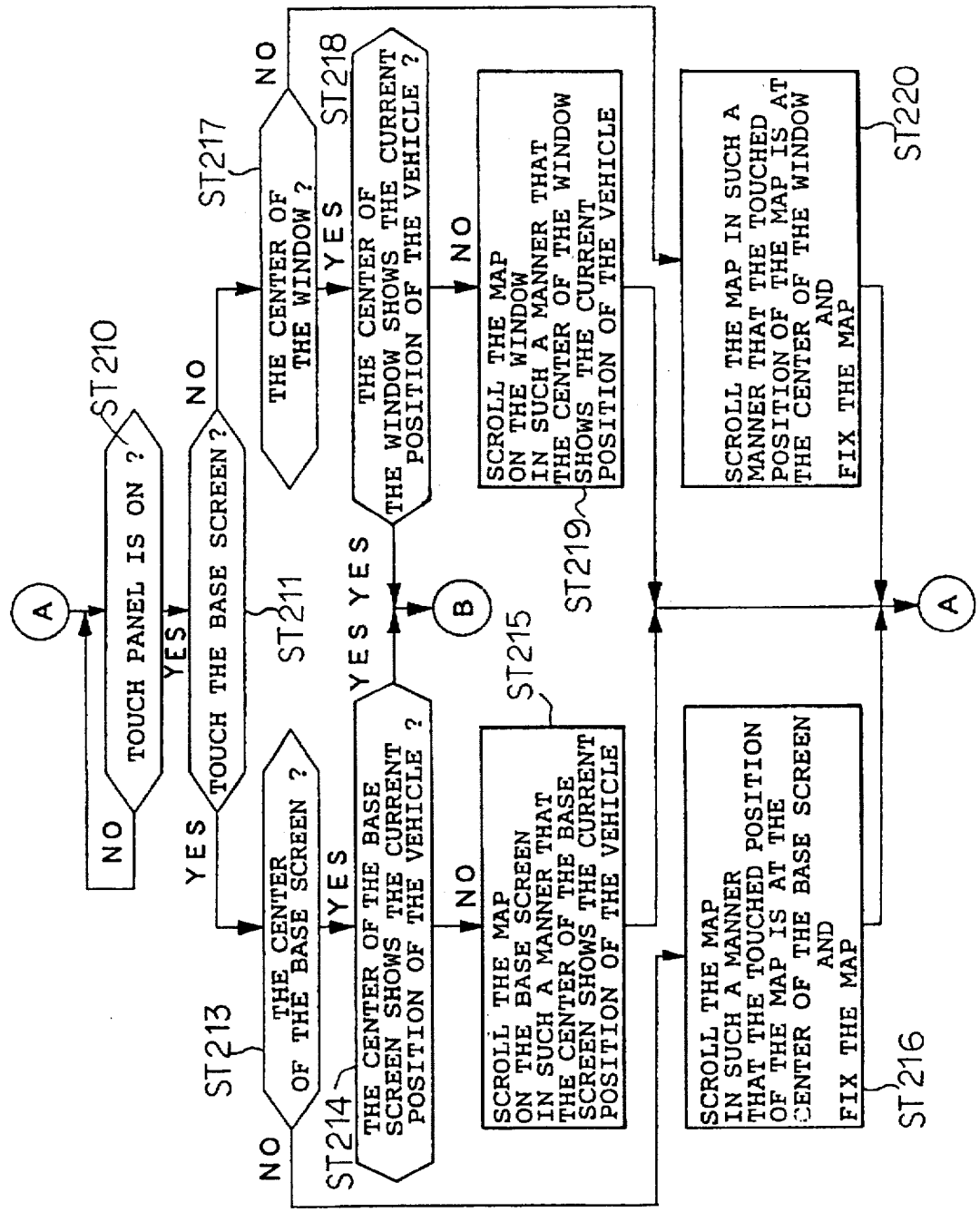

Next, a basic operation of the control unit 4 will be explained by referring to flow diagrams in FIGS. 13 and 14.

In step ST201, when the navigation apparatus is activated through the operating unit 9, the control unit 4 receives data on the current position of the vehicle detected by the position detecting unit 3 and then sends the data to the memory drive 6. According to the received position data, the memory drive 6 reads out map data about an area in the vicinity of the vehicle position from the map memory 5. The scale of the map data is equivalent to the last one which has been set with the operating unit 9 and is stored in the last memory. For example, the scale of the map data is a scale of 1 to 12,500. The control unit 4 proceeds to step ST 202 wherein it allows the display unit 7 to display the read out map image on the screen of the display unit 7 in such a manner that the current vehicle position on the map image is constantly at the center of the map image, as shown in FIG. 5. The display unit 7 further displays the triangle-shaped vehicle position mark 20 at the center of the map image to inform the driver of the direction in which the vehicle is headed. After that, the control unit maintains scroll mode in which the map image is automatically scrolled as the position of the vehicle changes due to the travel of the vehicle, so that the center of the map image constantly shows the current vehicle position.

In the case that a map image and the vehicle position mark are displayed on the screen as shown in FIG. 4, when the user touches the surface of the touch panel with a finger or the like to activate it in step ST 203, the touch position detecting section 8 determines which sensitive part is activated in step ST204. If the user touches the touch position 3e in FIG. 11 which corresponds to the center of the touch panel as shown in FIG. 15, the display unit is switched to parent display mode in which a window is also displayed on the screen as shown in FIG. 16. The memory drive 6 reads out map data about an area in the vicinity of the current vehicle position to display the map information in the base screen region 21. The scale of the map data is equivalent to the previous one which has been set for the base screen region and is stored in the last memory. For example, the scale of the map data to be displayed in the base screen region 21 is a scale of 1 to 12,500. The control unit 4 advances to step ST 205 wherein it allows the display unit 7 to display the read out map image in the base screen region on the screen thereof in such a manner that the current vehicle position on the map image is constantly at the center of the base screen region 21 which is not hidden by the window screen region 22, as shown in FIG. 16. The display unit 7 further displays the triangle-shaped vehicle position mark 20 at the center of the base screen region to inform the driver of the direction in which the vehicle is headed.

Furthermore, the memory drive 6 reads out map data about an area in the vicinity of the current vehicle position to display the map information in the window screen region 22. The scale of the map data is equivalent to the previous one which has been set for the window screen region and is stored in the last memory. For example, the scale of the map data which is to be displayed in the window screen region is a scale of 1 to 25,000. The control unit 4 advances to step ST 206 wherein it allows the display unit 7 to display the read out map image in the window screen region on the screen thereof in such a manner that the current vehicle position on the map image is constantly at the center of the window screen region 22, as shown in FIG. 16. The display unit 7 further displays the triangle-shaped vehicle position mark 20 at the center of the window screen region to inform the driver of the direction in which the vehicle is headed. After that, the control unit maintains scroll mode in which the map images in the base screen region 21 and window screen region 22 are automatically scrolled as the position of the vehicle changes due to the travel of the vehicle so that both the centers of the screen regions constantly show the current vehicle position.

In step ST204, if the user touches a touch position except the central touch position 3e as shown in FIG. 17, the single map image is scrolled so that the touched part of the map image, which corresponds to the touched part of the touch panel, is displayed at the center of the screen in step ST207. The cross mark 23 showing the center of the map image is also displayed on the screen. After that, the display unit is switched into fixed mode in which the map image is fixed (not scrolled) and the current position mark 20 moves as the position of the vehicle changes.

In fixed mode, when the user touches the surface of the touch panel with a finger or the like to activate it in step ST 208, the touch position detecting section 8 determines which sensitive part is activated in step ST209. If the user touches a part of the touch panel apart from the center, the control unit returns to step ST 207 wherein it scrolls the single map image so that the part of the map image, which corresponds to the touched part of the touch panel, is constantly displayed at the center of the screen.

When the user touches the touch position 3e at the center of the touch panel, the control unit returns step ST202 wherein it allows the display unit to display the single map image in such a manner that the center of the map image constantly shows the current vehicle position and the vehicle position mark 20. Then, the display unit is switched into scroll mode in which the center of the map image constantly shows the current position of the vehicle.

In the case that the display unit is put in parent display mode in which map images are displayed in the base screen region 21 and window screen region 22 as shown in FIG. 6, when the user touches the touch panel with a finger or the like to activate it in step ST 210, the touch position detecting section 8, in step ST211, informs the control unit 4 of which sensitive part is activated. If the user touches one of the touch positions 1a to 5f in horizontal rows a to f shown in FIG. 12, the control unit determines that the base screen region 21 is indicated and further determines which area of the base screen region corresponds to the touched part of the touch panel in step ST 213. If the indicated part of the touch panel corresponds to the center of the base screen region 21 as shown in FIG. 19, that is, if the touch position 3c or 3d is indicated, the control unit, in step ST214, judges which mode has been selected for the base screen region, that is, either scroll mode in which the center of screen constantly shows the current vehicle position or fixed mode in which the map image is not scrolled, i.e., the map image is fixed has been selected. If the base screen region is put in scroll mode, the control unit returns to step ST 202 wherein it switches the display unit to a state of displaying a single map image the center of which constantly shows the current position of the vehicle while maintaining scroll mode, as shown in FIG. 20. The single map image is associated with the map image which has been displayed in the base screen region.

On the other hand, if the base screen region is put in fixed mode, the display unit scrolls the map image in the base screen region so that the center of the base screen region shows the current position of the vehicle and goes into scroll mode in step ST215. Then, the control unit returns to step ST210.

In performing step ST213, if the touched part of the touch panel corresponds to an area apart from the center of the base screen region 21 as shown in FIG. 21, the display unit scrolls the displayed map image in the base screen region so that the part of the map image which corresponds to the touched part of the touch panel is constantly displayed at the center of the base screen region 21, as shown in FIG. 22, and the base screen region 21 goes into fixed mode in step ST216. Then, the control unit returns to step ST210. In step ST215 or ST216, even if the base screen region 21 goes into scroll mode in which the center of the base screen region constantly shows the current vehicle position or fixed mode in which the map image is not scrolled, the window screen region is not affected by the change in the mode of the base screen region regardless of which mode has been selected for the window screen region.

If the user touches one of the touch positions 1g to 5i in horizontal rows g to i in FIG. 12 in step ST211 above, the control unit determines that the window screen region 22 is indicated and further determines which area of the window screen region corresponds to the touched part of the touch panel in step ST 217. If the indicated part of the touch panel corresponds to the center of the window screen 22 as shown in FIG. 23, that is, if the touch position 3h is touched, the control unit, in step ST218, judges which mode has been selected for the window screen region, that is, either scroll mode in which the center of the window screen region constantly shows the current vehicle position or fixed mode in which the map image is not scrolled, i.e., the map image is fixed has been selected. If the window screen region is put in scroll mode, the control unit returns to step ST 202 wherein it allows the display unit to display a single map image the center of which constantly shows the current position of the vehicle while maintaining scroll mode, as shown in FIG. 24. The single map image is associated with the map image which has been displayed in the window screen region.

On the other hand, if it is determined that fixed mode has been selected for the window screen region in step ST218 above, the display unit scrolls the map image in the base screen region so that the center of the window screen region shows the current position of the vehicle and then the window screen goes into scroll mode in step ST219. Then, the control unit returns to step ST210. If it is determined that the touched part of the touch panel corresponds to an area of the window screen region 22 apart from the center, in performing step ST217, as shown in FIG. 25, the display unit scrolls the displayed map image so that the part of the map image which corresponds to the touched part of the touch panel is constantly displayed at the center of the window screen region 22 and the base screen region 22 goes into fixed mode in step ST220, as shown in FIG. 26. Then, the control unit returns to step ST210. In step ST219 or ST220, even if the window screen region 22 goes into scroll mode in which the center of the window screen region constantly shows the current vehicle position or fixed mode in which the map image is not scrolled, the base screen region is not affected by the change in the mode of the window screen region regardless of which mode has been selected for the base screen region.

Next, the description will be directed to another embodiment of the present invention. However, since the map information display apparatus, i.e., the navigation apparatus of this embodiment has the same structure as the first embodiment mentioned above, the structure of the apparatus according to this embodiment will not be explained.

In operation, when the user turns on the navigation apparatus with the operating unit 9, a single map image the center of which constantly shows the current vehicle position is displayed on the screen of the display unit, as shown in FIG. 5. When the user touches the center of the screen as shown in FIG. 15, the window screen region is also displayed as shown in FIG. 16. For example, a map image, which is associated with the map image which has been displayed on the screen, drawn on a scale of 1 to 12,500 is displayed in the base screen region 21 and a map image, which is associated with the map image which has been displayed on screen, drawn on a scale of 1 to 25,000 is displayed in the window screen region 22. Alternatively, when the user touches a part of the screen apart from the center as shown in FIG. 17, the single map image is scrolled so that the part of the map image, which corresponds to the touched part of the touch panel, is displayed at the center of the screen as shown in FIG. 18. Then, the cross line mark 23 for showing the center of the screen is further displayed.

Each time the user touches a part of the screen apart from the center, the single map image is scrolled, however, when the user touches the cross mark 23 at the center of the screen, the display unit returns to scroll mode in which the map image the center of which constantly shows the current position of the vehicle is displayed on the screen, as shown in FIG. 17. That is, the same operation as the second embodiment is performed in single display mode of displaying a single map which fills the screen.

Figure 28:
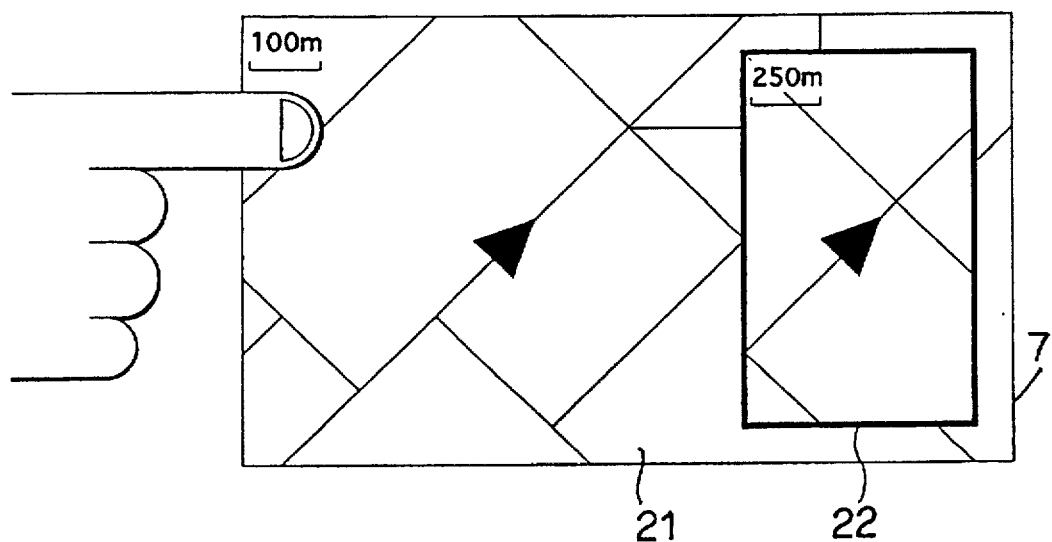
FIG. 28 is another representation of the display unit with a window shown thereon according to another embodiment of the present invention.
Figure 29:
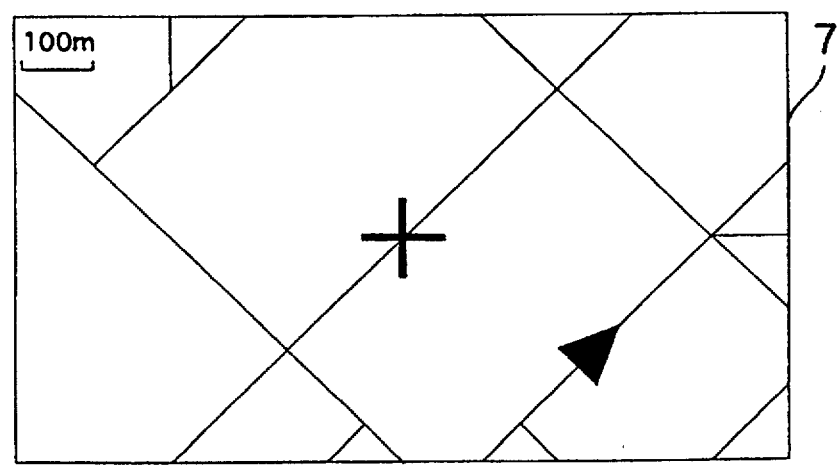
FIG. 29 is a representation of a display unit with a map image according to the embodiment of the present invention.

In the case of parent display mode in which two map images are displayed in the base and window screen regions, when the user touches the base screen region 21 as shown in FIG. 28, the control unit allows the display unit to display a single map image, which is associated with the map image which has been displayed in the base screen region, with the same scale as the map image which has been displayed in the base screen region, i.e., a scale of 1 to 12,500, as shown in FIG. 29. In this case, the map image is scrolled so that the touched part of the map image shown in FIG. 29 is constantly displayed at the center of the screen and the cross line mark 23 showing the center of the screen is further displayed.

Figure 30:
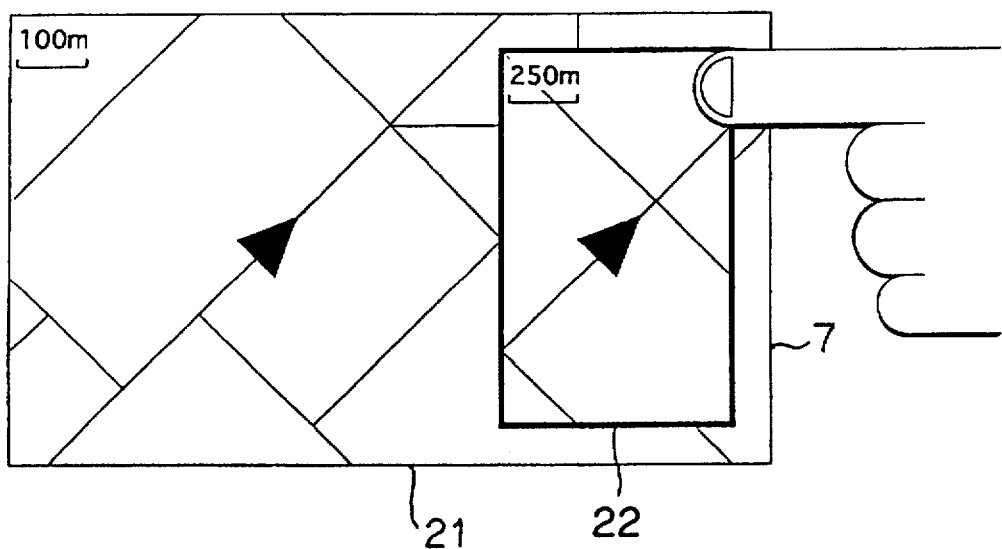
FIG. 30 is another representation of the display unit with a window shown thereon according to the embodiment of the present invention.
Figure 31:
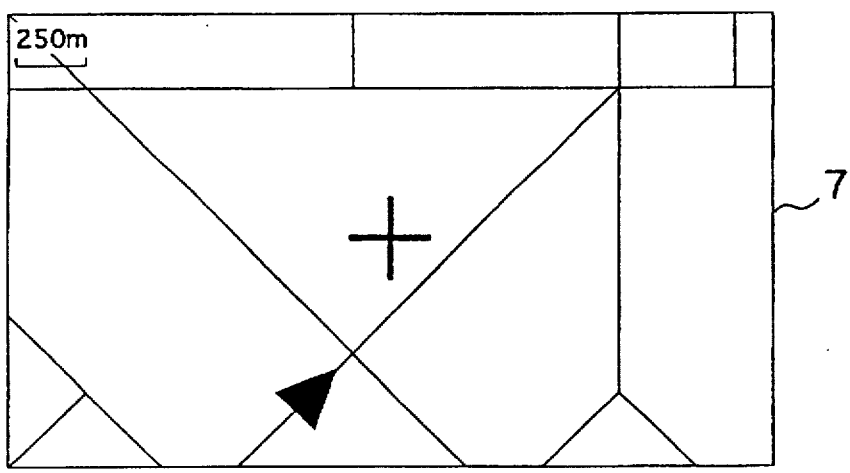
FIG. 31 is a representation of a display unit with a map image according to the embodiment of the present invention.
Figure 32:
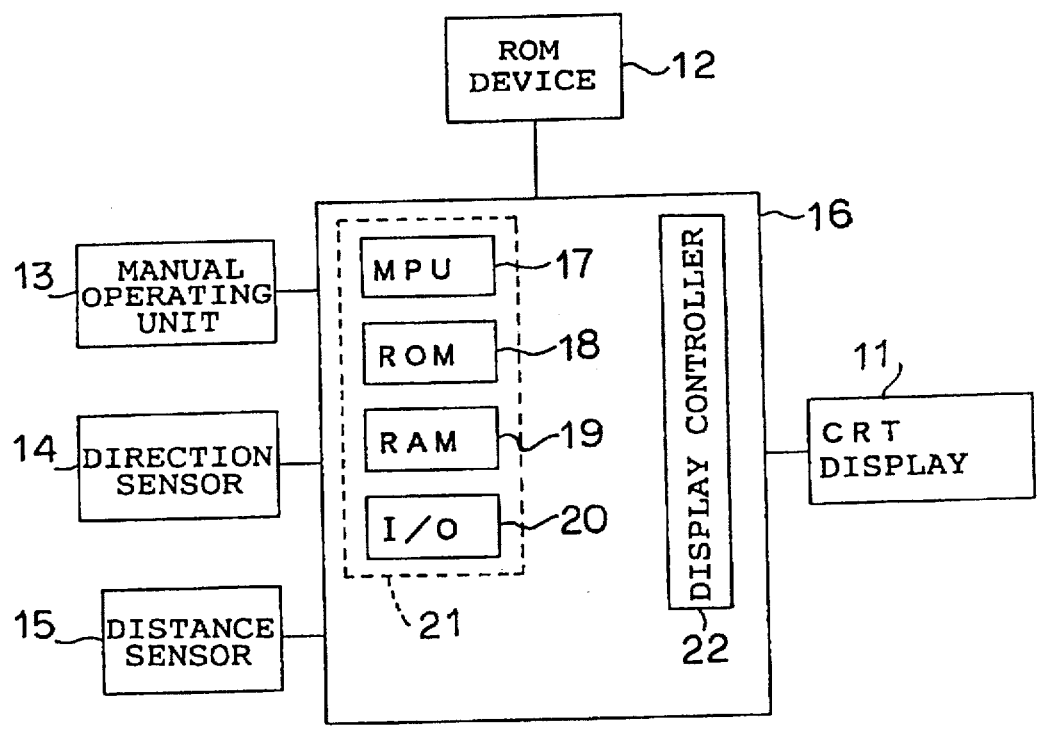
FIG. 32 is a block diagram showing the structure of a prior art map information display apparatus.
Figure 33:
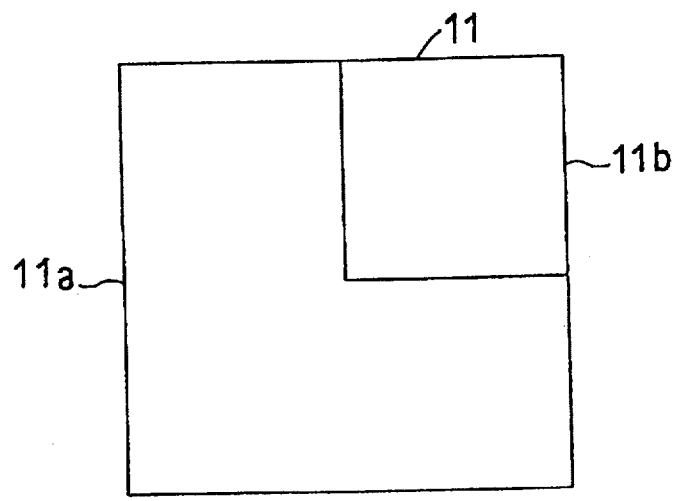
FIG. 33 is a plan view showing areas on the screen of a display unit of the prior art apparatus of FIG. 32.

When the user touches the window screen region 22 as shown in FIG. 30, the control unit allows the display unit to display a single map image, which is associated with the map image which has been displayed in the window screen region, with the same scale as the map image which has been displayed in the window screen, i.e., a scale of 1 to 25,000, as shown in FIG. 31. In this case, the map image is scrolled so that the touched part of the map image shown in FIG. 30 is constantly displayed at the center of the screen and the cross line mark 23 showing the center of the screen is further displayed.

Figure 27:
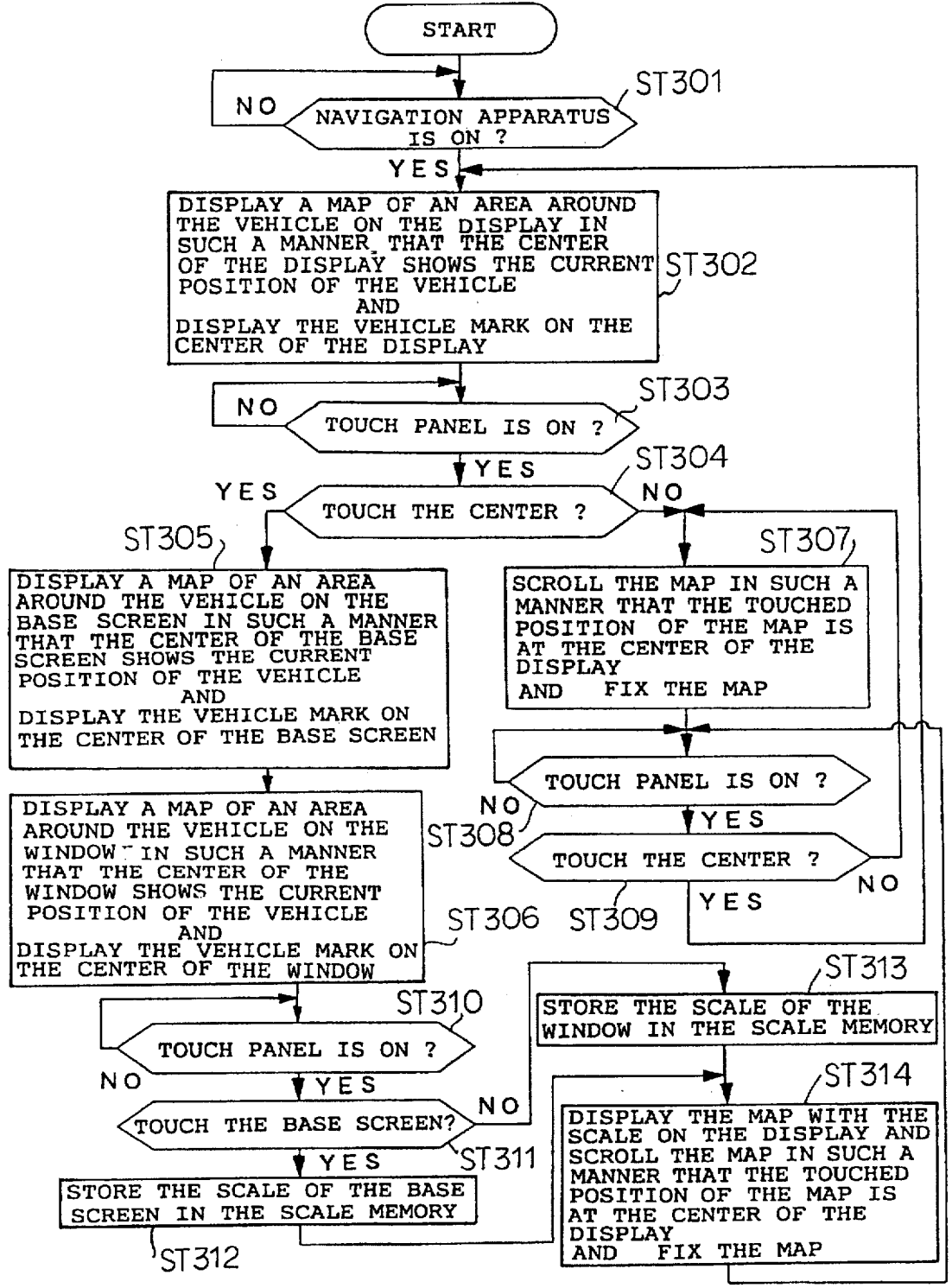
FIG. 27 is a flow diagram showing an operation of the navigation apparatus of the embodiment.

Next, a basic operation of the control unit 4 will be explained by referring to FIG. 27. Since the operation concerning steps ST301 to ST309 in single display mode in which a single map image is displayed on the screen is the same as that in steps ST201 to ST209 of FIG. 13 according to the second embodiment, the operation will not be described hereinafter.

In the case of parent display mode in which map images are displayed in the base screen region 21 and window screen region 22 as shown in FIG. 28, when the user touches the surface of the touch panel with a finger or the like to activate it in step ST 310, the touch position detecting section 8, in step ST311, informs the control unit 4 of which sensitive part is activated. If the user touches a part of the touch panel 8 which corresponds to an area within the base screen region 21 which is not hidden by the window screen region 22, i.e., one of the touch switches 1a to 5f in horizontal rows a to f shown in FIG. 12, the control unit determines that a part of the touch panel which corresponds to the base screen region is indicated and further determines which area of the base screen region corresponds to the touched part of the touch panel. Then, the scale of the map image displayed in the base screen region 21 is registered in the scale memory in step ST312. The control unit obtains the coordinates of the point on the map image which corresponds to the touched part of the touch panel and the memory drive 6 reads out map data of an area in the vicinity of the touched point on the map image from the map memory 5. The scale of the map data is equivalent to the one of the map image in the base screen region stored in the scale memory in step ST312; the scale of the read out map is a scale of 1 to 12,500. The display unit displays a single map image, which is associated with the map image which has been displayed in the base screen region, with the same scale as the map image which has been displayed in the base screen region stored in the memory in such a manner that the point of the map image represented by the obtained coordinates is constantly displayed at the center of the screen thereof, as shown FIG. 29. The screen on which the single map image is displayed goes into fixed mode in step ST314. Then, the control unit returns to step ST308.

If the user touches one of the touch positions 1g to 5i in horizontal rows g to i in FIG. 12 in step ST311 above, as shown in FIG. 30, the control unit determines that the window screen 22 is indicated and further determines which area of the window screen region corresponds to the touched part of the touch panel in step ST 313. Then, the scale of the map image displayed in the window screen region 22 is registered in the scale memory in step ST313. The control unit obtains the coordinates of the point on the map image which corresponds to the touched part of the touch panel and the memory drive 6 reads out map data of an area in the vicinity of the touched point on the map image from the map memory 5. The scale of the map data is equivalent to the one of the map image in the window screen region stored in the scale memory in step ST313; the scale of the read out map is a scale of 1 to 25,000. The display unit displays a single map image, which is associated with the map image which has been displayed in the window screen region, with the same scale as the map image which has been displayed in the window screen region stored in the memory in such a manner that the point of the map image represented by the obtained coordinates is constantly displayed at the center of the screen thereof, as shown FIG. 31. The screen on which the single map image is displayed goes into fixed mode in step ST314. Then, the control unit returns to step ST308.

As previously mentioned, the present invention offers many advantageous effects as follows:

Since the navigation apparatus of the invention is so structured that the display unit can be switched from single display mode in which a single map image is displayed on the screen to parent display mode in which two map images are displayed in the base and window screen regions by touching the surface of the touch panel laid over the screen, the present invention makes it possible to easily switch between single display mode and parent display mode without having to use a mechanical switch.

According to a preferred embodiment of the present invention, when the display unit is put in single display mode in which a single map image is displayed on the screen of the display unit, if the user touches a part except the center of the touch panel, the display unit can be switched from scroll mode in which a single map image, the center of which constantly shows the current position of the vehicle, is displayed on the screen to fixed mode in which the single map image, the center of which is coincident with the touched part of the map image, is displayed on the screen and hence the map image is not scrolled as the vehicle travels. Therefore, the present invention makes it possible to easily utilize a part except the center of the touch panel for the purpose of scrolling the map image.

According to a preferred embodiment of the present invention, when the display unit is put in parent display mode in which two map images are respectively displayed in the base and screen regions on the screen of the display unit, if the user touches the base screen region, the display unit is switched into single display mode in which a map image with the same scale as the map image which has been displayed in the base screen region, whereas if the user touches the window screen region, the display unit is switched into single display mode in which a map image with the same scale as the map image which has been displayed in the window screen region. Therefore, the present invention makes it possible to easily switch between single display mode and parent display mode without having to use a mechanical switch.

According to a preferred embodiment of the present invention, when the display unit is put in parent display mode in which two map images are respectively displayed in the base and screen regions on the screen of the display unit, if the user touches the center of the base or window screen region, the display unit is switched into single display mode in which a map image with the same scale as the map image which has been displayed in the base or window screen region, whereas if the user touches a part except the center of the base or window screen region, the display unit is switched into single display mode in which a map image with the same scale as the map image which has been displayed in the base or window screen region and the center of the map image is coincident with the touched part of the map image displayed in the base or window screen region. Therefore, the present invention makes it possible to easily switch between single display mode and parent display mode without having to use a mechanical switch. Furthermore, the present invention makes it possible to easily utilize a part except the center of the touch panel for the purpose of scrolling the map image.

Many widely different embodiments of the present invention may be constructed without departing from the spirit and scope of the present invention. It should be understood that the present invention is not limited to the specific embodiments described in the specification, except as defined in the appended claims.

What is claimed is:

1. A map information display apparatus for use with a vehicle, comprising:

a position detecting means for detecting a current position of the vehicle;

a map storage means for storing map information classified into plural levels of scale;

a display means having a screen for displaying a map image based on a piece of map information read out from said storage means and the current position of the vehicle detected by said position detection means on said screen;

a touch position detecting means, responsive to a touch operation of a user, for generating a signal showing which part of said display means has been touched;

a control means, responsive to a signal informing that a predetermined area on said display means has been touched, for switching said display means from a state of displaying a single map image on the screen of said display means in scroll mode in which the center of the map image constantly shows the current position of the vehicle detected by said position detecting means and the map image is scrolled as the vehicle travels to a state of displaying a first map image with the same scale as the single map image which has been displayed on the screen in a base screen region on the screen and a second map image with a scale in a window screen region on the screen, while maintaining scroll mode for both the regions.

2. A map information display apparatus according to claim 1, wherein said predetermined area on said display means is anywhere on the surface of the screen.

3. A map information display apparatus according to claim 2, wherein said control means, in response to a signal informing that an area on said display means which corresponds to the base screen region on the screen has been touched, switches said display means from a state of displaying the first and second map images in the base and window screen regions in scroll mode to a state of displaying a single map image with the same scale as the first map image which has been displayed in the base screen region while maintaining scroll mode, and wherein said control means, in response to a signal informing that an area on said display means which corresponds to the window screen region on the screen has been touched, switches said display means from the state of displaying the first and second map images in the base and window screen regions in scroll mode to a state of displaying a single map image with the same scale as the second map image which has been displayed in the window screen region while maintaining scroll mode.

4. A map information display apparatus according to claim 2, wherein said predetermined area is unidentified on said screen.

5. A map information display apparatus according to claim 1, wherein said predetermined area on said display means is only a central area in the vicinity of the center on said display means which corresponds to the center of the screen of said display means.

6. A map information display apparatus according to claim 5, wherein when a single map image is displayed on the screen of said display means and said control means receives a signal informing that an area except the central area on said display means has been touched, said control means scrolls the map image displayed on the screen and switches said display means from the state of displaying the map image in scroll mode to a state of displaying a map image in fixed mode in which the center of the map image constantly shows a point on the map image which corresponds to the touched area on said display means and the map image is not scrolled even if the vehicle travels.

7. A map information display apparatus according to claim 6, wherein when said control means further receives a signal informing that the central area on said display means has been touched, it scrolls the single map image displayed on the screen and switches said display means from the state of displaying the single map image on the screen of said display means in fixed mode to a state of displaying a single map image in scroll mode in which the center of the map image constantly shows the current position of the vehicle and the map image is scrolled as the vehicle travels.

8. A map information display apparatus according to claim 5, wherein when the first and second map images are respectively displayed in the base and window screen regions in scroll mode, said control means, in response to a signal informing that an area on said display means which corresponds to a predetermined area of the base screen region on the screen has been touched, switches said display means to a state of displaying a single map image with the same scale as the map image which has been displayed in the base screen region on the screen of said display means.

9. A map information display apparatus according to claim 8, wherein the predetermined area of the base screen region is a central area of the base screen region, and when the touched area on said display means corresponds to the central area of the base screen region on the screen, said control means switches said display means to a state of displaying in scroll mode a single map image with the same scale as the map image which has been displayed in the base screen region on the screen of said display means, and wherein if the touched area on said display means corresponds to an area except the central area of the base screen region on the screen, said control means scrolls the first map image in the base screen region and then switches the base screen region to fixed mode in which the center of the first map image in the base screen region constantly shows a point on the first map image which corresponds to the touched area on said display means and the first map image is not scrolled even if the vehicle travels.

10. A map information display apparatus according to claim 9, wherein when the first map image is displayed in the base screen region in fixed mode, said control means, in response to a signal informing that an area on said display means which corresponds to the central area of the base screen region on the screen has been touched, scrolls the first map image in the base screen region and then switches the base screen region to scroll mode in which the center of the first map image in the base screen region constantly shows the current position of the vehicle and the first map image is scrolled as the vehicle travels.

11. A map information display apparatus according to claim 8, wherein the predetermined area of the base screen region is anywhere in the base screen region, and if the touched area on said display means corresponds to the base screen region on the screen, said control means switches said display means to a state of displaying a single map image on the screen of said display means in fixed mode in which the center of the single map image constantly shows a point on the map which corresponds to the touched area on said display means and hence the single map image is not scrolled even if the vehicle travels.

12. A map information display apparatus according to claim 11, wherein when said control means further receives a signal informing that the central area on said display means has been touched, it scrolls the single map image on the screen and switches said display means from a state of displaying in fixed mode the single map image on the screen of said display means to a state of displaying a single map image in scroll mode in which the center of the single map image constantly shows the current position of the vehicle and the single map image is scrolled as the vehicle travels.

13. A map information display apparatus according to claim 8, wherein when the first and second map images are respectively displayed in the base and window screen regions in scroll mode, said control means, in response to a signal informing that an area of said display means which corresponds to a predetermined area of the window screen region on the screen has been touched, switches said display means to a state of displaying a single map image with the same scale as the second map image which has been displayed in the window screen region on the screen of said display means.

14. A map information display apparatus according to claim 13, wherein the predetermined area of the window screen region is a central area of the window screen region, and when the touched area on said display means corresponds to the central area of the window screen region on the screen, said control means switches said display means to a state of displaying in scroll mode a single map image with the same scale as the second map image which has been displayed in the window screen region on the screen of said display means, and wherein if the touched area on said display means corresponds to an area except the central area of the window screen region on the screen, said control means scrolls the second map image in the window screen region and then switches the window screen region to fixed mode in which the center of the second map image in the window screen region constantly shows a point on the second map image which corresponds to the touched area on said display means and the second map image is not scrolled even if the vehicle travels.

15. A map information display apparatus according to claim 14, wherein when the second map image is displayed in the window screen region in fixed mode, said control means, in response to a signal informing that an area on said display means which corresponds to the central area of the window screen region on the screen has been touched, scrolls the second map image in the window screen region and switches the window screen region to scroll mode in which the center of the second map image in the window screen region constantly shows the current position of the vehicle and the second map image is scrolled as the vehicle travels.

16. A map information display apparatus according to claim 13, wherein the predetermined area of the window screen region is anywhere in the window screen region, and if the touched area on said display means corresponds to the window screen region on the screen, said control means switches said display means to a state of displaying a single map image on the screen of said display means in fixed mode in which the center of the single map image constantly shows a point on the map which corresponds to the touched area on said display means and hence the single map image is not scrolled even if the vehicle travels.

17. A map information display apparatus according to claim 16, wherein when said control means further receives a signal informing that the central area on said display means has been touched, it scrolls the single map image and switches said display means from a state of displaying in fixed mode the single map image on the screen of said display means to a state of displaying a single map image in scroll mode in which the center of the single map image constantly shows the current position of the vehicle and the single map image is scrolled as the vehicle travels.

18. A map information display apparatus according to claim 5, wherein said predetermined area is unidentified on said screen.

* * * * *